(12) United States Patent
Oh et al.

(10) Patent No.: US 9,900,067 B2
(45) Date of Patent: Feb. 20, 2018

(54) METHOD AND APPARATUS FOR TRANSMITTING AND RECEIVING DATA IN A MIMO SYSTEM

(71) Applicant: Electronics and Telecommunications Research Institute, Daejeon (KR)

(72) Inventors: Jong-Ee Oh, Daejeon (KR); Minho Cheong, Daejeon (KR); Sok-Kyu Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

(21) Appl. No.: 14/147,447

(22) Filed: Jan. 3, 2014

(65) Prior Publication Data

US 2014/0119327 A1  May 1, 2014

Related U.S. Application Data

(63) Continuation of application No. 13/434,681, filed on Mar. 29, 2012, now Pat. No. 8,654,881, which is a
(Continued)

(30) Foreign Application Priority Data

Mar. 12, 2010  (KR) .................. 10-2010-0022122
Jul. 8, 2010   (KR) .................. 10-2010-0065898
(Continued)

(51) Int. Cl.
*H04B 7/02*  (2017.01)
*H04L 1/02*  (2006.01)
(Continued)

(52) U.S. Cl.
CPC ......... *H04B 7/0452* (2013.01); *H04L 1/0083* (2013.01); *H04L 1/08* (2013.01);
(Continued)

(58) Field of Classification Search
CPC ..... H04W 84/12; H04W 4/08; H04W 72/121; H04W 28/06; H04B 7/0452
(Continued)

(56) References Cited

U.S. PATENT DOCUMENTS 9,397,785 B1 * 7/2016 Zhang ................. H04L 1/0061
2009/0031185 A1 1/2009 Xhafa et al.
(Continued)

FOREIGN PATENT DOCUMENTS

JP  2007-081702 A  3/2007
JP  2008-072275 A  3/2008
(Continued)

OTHER PUBLICATIONS

Lin X. Cai et al., "A Distributed Multi-User MIMO MAC Protocol for Wireless Local Area Networks", IEEE "Globcom" 2008 proceedings, 2008, pp. 1-5, IEEE.
(Continued)

*Primary Examiner* — Shuwang Liu
*Assistant Examiner* — Sung Ahn

(57) ABSTRACT

The present invention relates to a method and apparatus for transmitting and receiving data. A data transmission method from a sender terminal to a receiver terminal in a MIMO system using a variable frequency band according to one embodiment of the present invention comprises: repeatedly generating a signal field depending on a frequency band that is applied to the transmission of a data frame; generating a data field including the data; generating a data frame including the signal field and the data field; and transmitting the data frame to the receiver terminal. The present invention is advantageous in that a signal field which is transmitted together with the data being transmitted from the sender terminal to the receiver terminal in the MIMO system can be sent more efficiently.

44 Claims, 61 Drawing Sheets

Related U.S. Application Data continuation of application No. PCT/KR2011/001742, filed on Mar. 11, 2011.

(30) Foreign Application Priority Data

| | | |
|---|---|---|
| Jul. 9, 2010 | (KR) | 10-2010-0066458 |
| Jul. 14, 2010 | (KR) | 10-2010-0068167 |
| Jul. 27, 2010 | (KR) | 10-2010-0072506 |

(51) Int. Cl.

| | |
|---|---|
| *H04B 7/0452* | (2017.01) |
| *H04L 1/00* | (2006.01) |
| *H04L 1/08* | (2006.01) |
| *H04L 1/06* | (2006.01) |
| *H04L 5/00* | (2006.01) |
| *H04W 28/06* | (2009.01) |
| *H04W 84/12* | (2009.01) |
| *H04B 7/0413* | (2017.01) |

(52) U.S. Cl.
CPC .......... *H04B 7/0413* (2013.01); *H04L 1/0643* (2013.01); *H04L 5/003* (2013.01); *H04L 5/0007* (2013.01); *H04W 28/06* (2013.01); *H04W 84/12* (2013.01)

(58) Field of Classification Search
USPC ........ 375/260, 267; 370/328, 336, 338, 343, 370/474
See application file for complete search history.

(56) References Cited

U.S. PATENT DOCUMENTS

| | | | |
|---|---|---|---|
| 2009/0310692 A1 | 12/2009 | Kafle et al. | |
| 2010/0040158 A1* | 2/2010 | Aggarwal et al. | 375/260 |
| 2010/0260159 A1* | 10/2010 | Zhang et al. | 370/338 |
| 2010/0284393 A1* | 11/2010 | Abraham et al. | 370/343 |
| 2010/0309834 A1* | 12/2010 | Fischer et al. | 370/312 |
| 2011/0032875 A1* | 2/2011 | Erceg et al. | 370/328 |
| 2011/0249660 A1* | 10/2011 | Noh et al. | 370/338 |
| 2011/0255620 A1* | 10/2011 | Jones et al. | 375/260 |
| 2011/0299468 A1* | 12/2011 | Van Nee et al. | 370/328 |
| 2012/0249660 A1* | 10/2012 | Schuster | 347/20 |
| 2012/0281774 A1* | 11/2012 | Lee et al. | 375/260 |
| 2012/0327915 A1* | 12/2012 | Kang et al. | 370/336 |

FOREIGN PATENT DOCUMENTS

| | | |
|---|---|---|
| KR | 10-2008-0050536 A | 6/2008 |
| KR | 10-2009-0084997 A | 8/2009 |
| KR | 10-2009-0119857 A | 11/2009 |
| WO | 2006/120979 A1 | 11/2006 |
| WO | WO 2006/120979 A1 | 11/2006 |
| WO | 2008/118429 A1 | 10/2008 |
| WO | WO 2008/118429 A1 | 10/2008 |
| WO | 2010/003373 A1 | 1/2010 |
| WO | WO 2010/003373 A1 | 1/2010 |
| WO | WO 2010/016596 A1 | 2/2010 |
| WO | 2011/031058 A2 | 3/2011 |
| WO | 2011/153335 A1 | 12/2011 |
| WO | WO 2011/153335 A1 | 12/2011 |
| WO | WO 2011/159830 A1 | 12/2011 |

OTHER PUBLICATIONS

David Astély et al., "LTE: The Evolution of Mobile Broadband", LTE Part II: 3GPP Release Apr. 8, 2009, pp. 44-51, IEEE.

International Search Report for PCT/KR2011/001742 filed on Mar. 11, 2011.

Joonsuk Kim et al., "Bits Consideration for Signal fields", IEEE, Mar. 2010.

Hongyuan Zhang et al., "802.11ac Preamble Discussions; IEEE 802.11-09/1174r0", IEEE Preamble Discussions, Nov. 16, 2009, pp. 1-10, vol. 802.11ac, IEEE, Piscataway, USA.

Hongyuan Zhang et al., "802.11ac Preamble; IEEE 802.11-10/0070r0", IEEE Preamble, Jan. 18, 2010, pp. 1-11, vol. 802.11ac, IEEE, Piscataway, USA.

Hemanth Sampath et al., "802.11ac Preamble; IEEE 802.11-10/876r0", IEEE Preamble, Jul. 13, 2010, pp. 1-18, vol. 802.11ac, IEEE, Piscataway, USA.

Extended European Search Report for International Application No. PCT/KR2011001742, dated Dec. 17, 2012.

"On the Consideration of Technical Candidates for LTE-advanced", 3GPP TSG RAN WG1 Meeting #53, R1-081809, May 9, 2008, pp. 1-12.

Jaewoo Park et al., "802.11ac MAC Frame Length Indication", IEEE 802.11-10/0358r1, May 18, 2010, pp. 1-9.

Aon Mujtaba et al., "TGn Sync Complete Proposal," IEEE 802.11-04/887r2, Sep. 2004, pp. 1-46, IEEE.

Leonardo Lanante, "IEEE802.11ac Preamble with Legacy 802.11a/n Backward Compatibility", doc. : IEEE 802.11-09/0847r1, Nov. 18, 2009.

Syed Aon Mujtaba, "TGn Sync Complete Proposal", doc. : IEEE 802.11-04/887r2, Sep. 2004, slides 1-46.

\* cited by examiner

FIG. 25
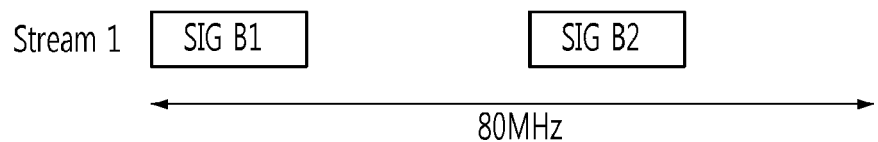
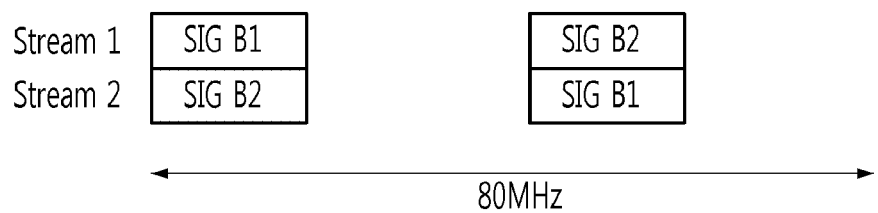

FIG. 26
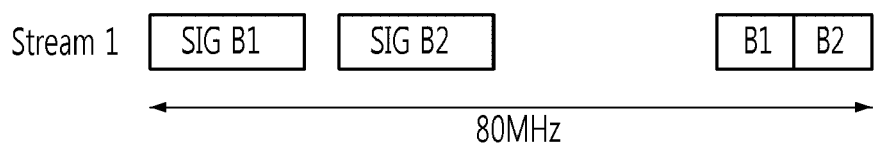
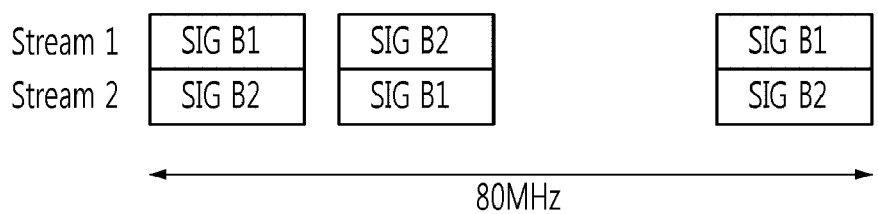
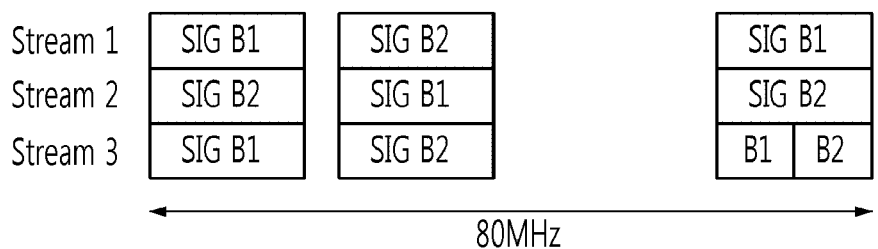
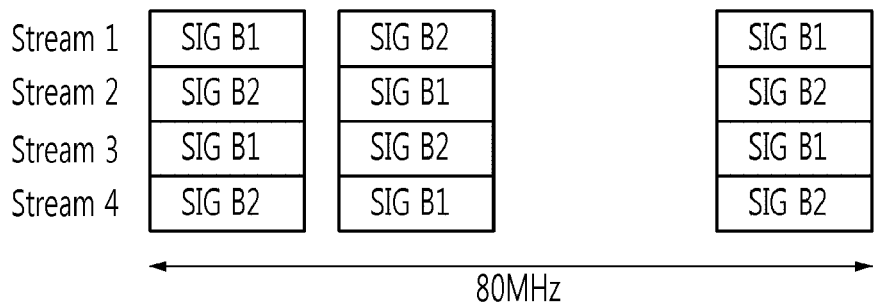

FIG. 27
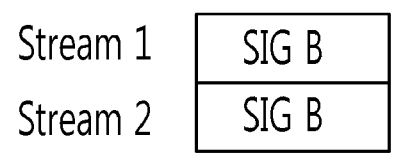
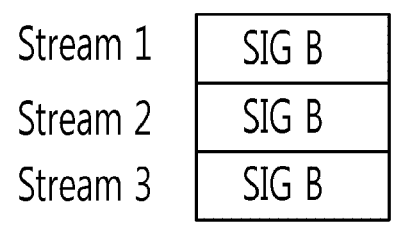
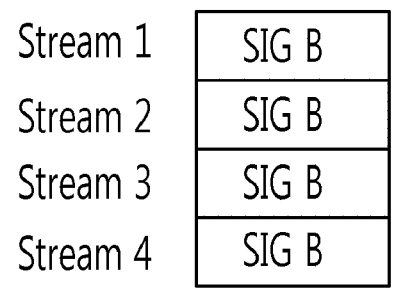

FIG. 39
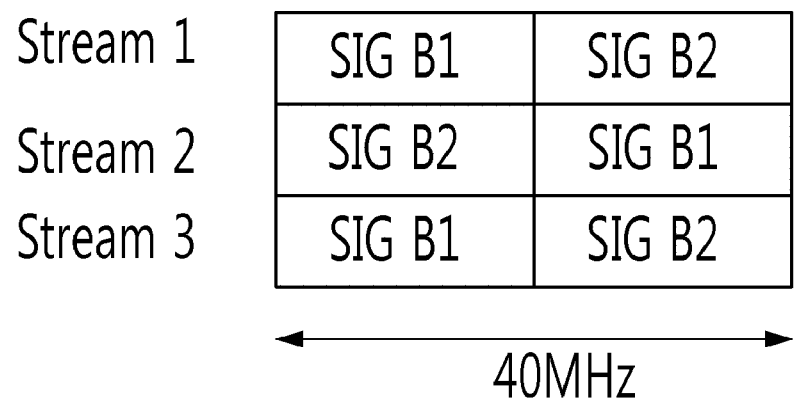
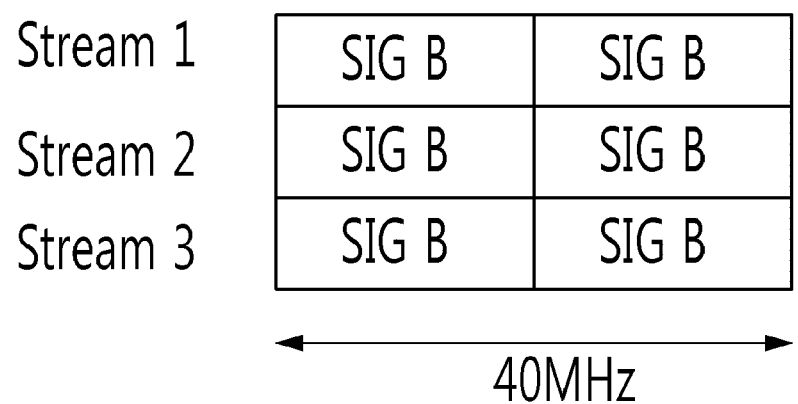

FIG. 40

| | | |
|---|---|---|
| Stream 1 | SIG B1 | SIG B2 |
| Stream 2 | SIG B2 | SIG B1 |
| Stream 3 | SIG B1 | SIG B2 |
| Stream 4 | SIG B2 | SIG B1 |

←――― 40MHz ―――→

| | | |
|---|---|---|
| Stream 1 | SIG B | SIG B |
| Stream 2 | SIG B | SIG B |
| Stream 3 | SIG B | SIG B |
| Stream 4 | SIG B | SIG B |

←――― 40MHz ―――→

FIG. 42
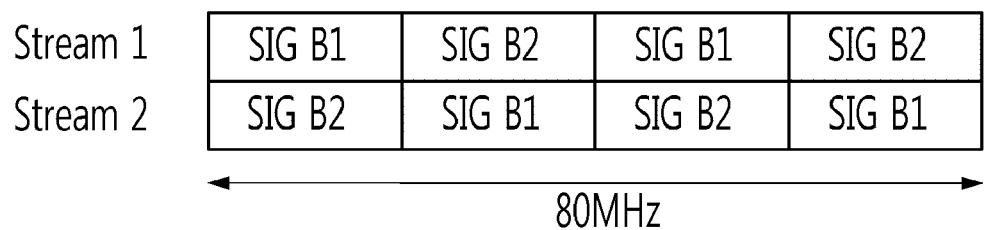
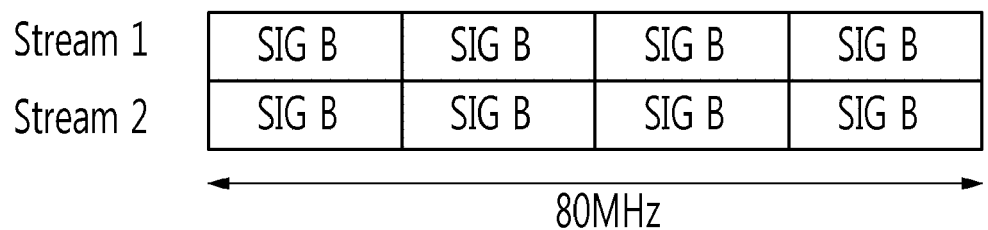

FIG. 43

| Stream 1 | SIG B1 | SIG B2 | SIG B1 | SIG B2 |
|---|---|---|---|---|
| Stream 2 | SIG B2 | SIG B1 | SIG B2 | SIG B1 |
| Stream 3 | SIG B1 | SIG B2 | SIG B1 | SIG B2 |

← 80MHz →

| Stream 1 | SIG B | SIG B | SIG B | SIG B |
|---|---|---|---|---|
| Stream 2 | SIG B | SIG B | SIG B | SIG B |
| Stream 3 | SIG B | SIG B | SIG B | SIG B |

← 80MHz →

FIG. 44

| Stream 1 | SIG B1 | SIG B2 | SIG B1 | SIG B2 |
|---|---|---|---|---|
| Stream 2 | SIG B2 | SIG B1 | SIG B2 | SIG B1 |
| Stream 3 | SIG B1 | SIG B2 | SIG B1 | SIG B2 |
| Stream 4 | SIG B2 | SIG B1 | SIG B2 | SIG B1 |

80MHz

| Stream 1 | SIG B | SIG B | SIG B | SIG B |
|---|---|---|---|---|
| Stream 2 | SIG B | SIG B | SIG B | SIG B |
| Stream 3 | SIG B | SIG B | SIG B | SIG B |
| Stream 4 | SIG B | SIG B | SIG B | SIG B |

80MHz

FIG. 45

| 20MHz SIG B | MCS 4bits | Length 16bits | Tail 6bits |
| 40MHz SIG B | MCS 4bits | Length 17bits | Tail 6bits |
| 80MHz SIG B | MCS 4bits | Length 19bits | Tail 6bits |

FIG. 48

| Stream 1 | SIG B 29 bits | SIG B 29 bits | SIG B 29 bits | SIG B 29 bits | PAD 1bits |
|---|---|---|---|---|---|
| Stream 2 | SIG B 29 bits | SIG B 29 bits | SIG B 29 bits | SIG B 29 bits | PAD 1bits |
| Stream 3 | SIG B 29 bits | SIG B 29 bits | SIG B 29 bits | SIG B 29 bits | PAD 1bits |
| Stream 4 | SIG B 29 bits | SIG B 29 bits | SIG B 29 bits | SIG B 29 bits | PAD 1bits |

80MHz

FIG. 50

| 20MHz SIG B | Length 17bits | Res. 3bits | Tail 6bits |
| 40MHz SIG B | Length 19bits | Res. 2bits | Tail 6bits |
| 80MHz SIG B | Length 21bits | Res. 2bits | Tail 6bits |

FIG. 53

| Stream 1 | SIG B 29 bits | SIG B 29 bits | SIG B 29 bits | SIG B 29 bits | PAD 1bits |
|---|---|---|---|---|---|
| Stream 2 | SIG B 29 bits | SIG B 29 bits | SIG B 29 bits | SIG B 29 bits | PAD 1bits |
| Stream 3 | SIG B 29 bits | SIG B 29 bits | SIG B 29 bits | SIG B 29 bits | PAD 1bits |
| Stream 4 | SIG B 29 bits | SIG B 29 bits | SIG B 29 bits | SIG B 29 bits | PAD 1bits |

80MHz

FIG. 57

| Stream 1 | SIG B 29 bits | SIG B 29 bits | SIG B 29 bits | SIG B 29 bits | PAD 1bits |
| --- | --- | --- | --- | --- | --- |
| Stream 2 | SIG B 29 bits | SIG B 29 bits | SIG B 29 bits | SIG B 29 bits | PAD 1bits |
| Stream 3 | SIG B 29 bits | SIG B 29 bits | SIG B 29 bits | SIG B 29 bits | PAD 1bits |
| Stream 4 | SIG B 29 bits | SIG B 29 bits | SIG B 29 bits | SIG B 29 bits | PAD 1bits |

←―――――――――――― 80MHz ――――――――――――→

METHOD AND APPARATUS FOR TRANSMITTING AND RECEIVING DATA IN A MIMO SYSTEM

CROSS-REFERENCES

The present application is a continuation of U.S. application Ser. No. 13/434,681, filed on Mar. 29, 2012, which is a continuation of PCT/KR2011/001742, filed on Mar. 11, 2011, which claims priority of Korean Patent Application No. 10-2010-0072506, filed on Jul. 27, 2010, Korean Patent Application No. 10-2010-0068167, filed on Jul. 14, 2010, Korean Patent Application No. 10-2010-0066458, filed on Jul. 9, 2010, Korean Patent Application No. 10-2010-0065898, filed on Jul. 8, 2010, Korean Patent Application No. 10-2010-0022122, filed on Mar. 12, 2010, which are incorporated herein by reference in their entirety.

TECHNICAL FIELD

The present invention relates to a method and apparatus for transmitting and receiving data and, more particularly, to a method and apparatus for transmitting and receiving data in a multiple input multiple output (MIMO) system.

BACKGROUND ART

A wireless local area network (WLAN) basically supports a basic service set (BSS) mode including an access point (AP) serving as a connection point of a distribution system (DS) and a plurality of stations (STAs), however, not APs, or an independent BSS (IBSS) mode including only stations (STAs) (hereinafter, AP and STA will be referred to as a 'terminal').

In a wireless communication system using multiple antennas, i.e., a MIMO system, a channel capacity is increased according to an increase in the number of antennas, and frequency efficiency can be enhanced accordingly. The MIMO system may be classified into the following two types of systems: a first one is a single user (SU)-MIMO, in which multiple streams are transmitted only to a single user, and a second one is a multi-user (MU)-MIMO in which multiple streams are transmitted to multiple users by canceling interference between users by an AP.

The MU-MIMO is advantageous in that it can obtain even a multi-user diversity gain along with the increase in channel capacity. Also, the MU-MIMO scheme can simultaneously transmit multiple streams to multiple users by using the same frequency band, increasing throughput in comparison to an existing communication scheme. In general, throughput of the wireless communication system can be increased by increasing the frequency band, but a system cost is disadvantageously increased according to the increase in the frequency band. Meanwhile, the MU-MIMO scheme does not increase the frequency band but its complexity is drastically increased in comparison to the existing communication scheme. Thus, in the standard such as 802.11ac, methods for simultaneously employing the MU-MIMO technique while using a variable frequency according to a surrounding situation have been researched.

In the wireless communication system in which multiple antenna streams are simultaneously transmitted to several users while using a variable frequency band, a data field and a signal field including information regarding the corresponding data field are transmitted. The signal field is divided into the following two types of fields. The first is a common signal field including information commonly applied to users. The second is a dedicated signal field including information individually applied to each user. The common signal field may be recognized by every user who belongs to a common user group or who may not belong to the common user group. Also, the common signal field is used for auto-detection for discriminating by which communication system a transmitted data frame has been generated (namely, it is used for auto-detection for discriminating a communication system by which a transmitted data frame was generated), so that, the common signal field is required to have compatibility. Thus, there is a limitation in changing the format or the configuration of the common signal field.

The common signal field is transmitted through a simple iterative structure to an SNR gain and a frequency diversity gain. However, the dedicated signal field cannot obtain both the SNR gain and the frequency diversity gain although such a simple iterative structure as that of the common signal field is used.

DISCLOSURE

Technical Problem

The present invention provides a method and apparatus for effectively transmitting a signal field which is transmitted together when a transmission terminal transmits data to a reception terminal in a multiple input multiple output (MIMO) system.

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

Technical Solution

In an aspect, a method for transmitting data by a transmission terminal to a reception terminal in a multiple input multiple output (MIMO) system using a variable frequency band includes iteratively generating a signal field according to a frequency band applied to transmission of a data frame, generating a data field including the data, generating a data frame including the signal field and the data field, and transmitting the data frame to the reception terminal.

In another aspect, a method for receiving data by a reception terminal from a transmission terminal in a multiple input multiple output (MIMO) system using a variable frequency band includes receiving a data frame including a signal field and a data field, and obtaining the data included in the data field by using the signal field, wherein the signal field is iteratively included in the signal field according to a frequency band applied to transmission of the data frame.

In another aspect, a transmission device transmitting data to a reception terminal in a multiple input multiple output (MIMO) system using a variable frequency band includes a signal field generation unit iteratively generating a signal field according to a frequency band applied to transmission of a data frame, a data field generation unit generating a data field including the data, a data frame generation unit generating a data frame including the signal field and the data field, and a transmission unit transmitting the data frame to the reception terminal.

In another aspect, a reception device receiving data from a transmission terminal in a multiple input multiple output (MIMO) system using a variable frequency band includes a reception unit receiving a data frame including a signal field and a data field, and a data obtaining unit obtaining the data included in the data field by using the signal field, wherein the signal field is iteratively included in the signal field according to a frequency band applied to transmission of the data frame.

Advantageous Effects

According to embodiments of the present invention, a signal field, which is transmitted together when a transmission terminal transmits data to a reception terminal in a MIMO system, can be effectively transmitted.

Also, in transmitting a dedicated signal field in the MU-MIMO system, the performance of the signal field is enhanced and a transmission time is reduced by utilizing a user's frequency band and the number of streams, whereby a large amount of information can be effectively transmitted by using the signal field.

DESCRIPTION OF DRAWINGS

FIG. 25 shows an embodiment of applying the data transmission method according to the present invention to a case in which data is transmitted via two non-contiguous multi-channels in an 80 MHz frequency band.

FIG. 26 shows an embodiment of applying the data transmission method according to the present invention to a case in which data is transmitted via three non-contiguous multi-channels in an 80 MHz frequency band.

FIG. 27 shows an embodiment of applying the data transmission method according to the present invention to a case in which data is transmitted by using one QPSK symbol in a 20 MHz frequency band.

FIG. 39 shows an embodiment of applying the data transmission method according to the present invention to a case in which a station (STA) receives three streams in a 40 MHz frequency band.

FIG. 40 shows an embodiment of applying the data transmission method according to the present invention to a case in which a station (STA) receives four streams in a 40 MHz frequency band.

FIG. 42 shows an embodiment of applying the data transmission method according to the present invention to a case in which a station (STA) receives two streams in an 80 MHz frequency band.

FIG. 43 shows an embodiment of applying the data transmission method according to the present invention to a case in which a station (STA) receives three streams in an 80 MHz frequency band.

FIG. 44 shows an embodiment of applying the data transmission method according to the present invention to a case in which a station (STA) receives four streams in an 80 MHz frequency band.

FIG. 45 shows a bit allocation of a VHT-SIG B when the VHT-SIG B has a length of 26 bits in a 20 MHz band, has a length of 27 bits in a 40 MHz band, and has a length of 29 bits in an 80 MHz band.

FIG. 48 shows an embodiment of applying the data transmission method according to the present invention to a case in which a station (STA) receives four streams in an 80 MHz frequency band, when the numbers of bits of the VHT-SIG B are allocated as shown in FIG. 45.

FIG. 50 shows a bit allocation of the VHT-SIG B when the VHT-SIG B has a length of 26 bits in a 20 MHz band, 27 bits in a 40 MHz band, and 29 bits in a 80 MHz band in SU-MIMO.

FIG. 53 shows an embodiment of applying the data transmission method according to the present invention to a case in which a station (STA) receives four streams in an 80 MHz frequency band, when the numbers of bits of the VHT-SIG B are allocated as shown in FIG. 50.

FIG. 57 shows an embodiment of applying the data transmission method according to the present invention to a case in which a station (STA) receives four streams in an 80 MHz frequency band, when a CDD technique is used and different delay is applied to each antenna.

MODE FOR INVENTION

Figure 1:
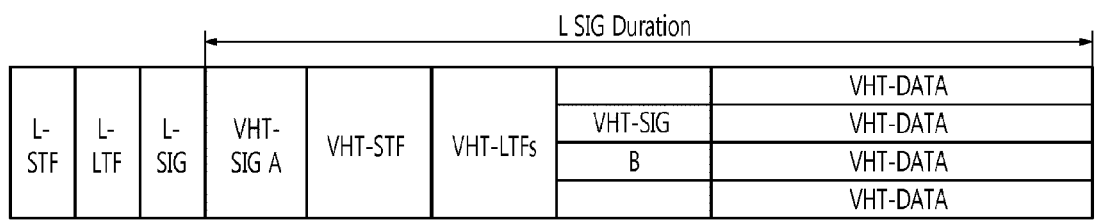
FIG. 1 shows the structure of a data frame used in a data transmission/reception method according to an embodiment of the present invention.

The foregoing and other objects, features, aspects and advantages of the present invention will be described in detail in conjunction with the accompanying drawings, and accordingly, a person skilled in the art to which the present invention pertains will easily implement the technical concept of the present invention. In describing the present invention, if a detailed explanation for a related known function or construction is considered to unnecessarily divert the gist of the present invention, such explanation will be omitted but would be understood by those skilled in the art. The embodiments of the present invention will now be described with reference to the accompanying drawings, in which like numbers refer to like elements in the drawings.

FIG. 1 shows the structure of a data frame used in a data transmission/reception method according to an embodiment of the present invention.

In FIG. 1, L-STF and L-LTF, training fields, and L-SIG, a signal field, are the same as those of a data frame used in an existing 802.11. The frame illustrated in FIG. 1 further includes fields dedicated for high speed wireless communication, i.e., very high throughput (VHT). VHT-STF and VHT-LTF are VHT-dedicated training fields, and VHT-SIG A and VHT-SIG B are VHT-dedicated signal fields.

The data frame of FIG. 1 includes data fields VHT-DATA including data transmitted to several users, respectively. VHT-SIG B includes information regarding each of the data fields. For example, VHT-SIG B may include information regarding the length of useful data included in the VHT-DATA field, information regarding a modulation and coding scheme (MCS) of the VHT-DATA field, and the like. Since the VHT-SIG B field includes information regarding each user, it corresponds to a dedicated signal field. Meanwhile, the VHT-SIG A field is a common signal field transmitted to be recognized by every user.

Figure 2:
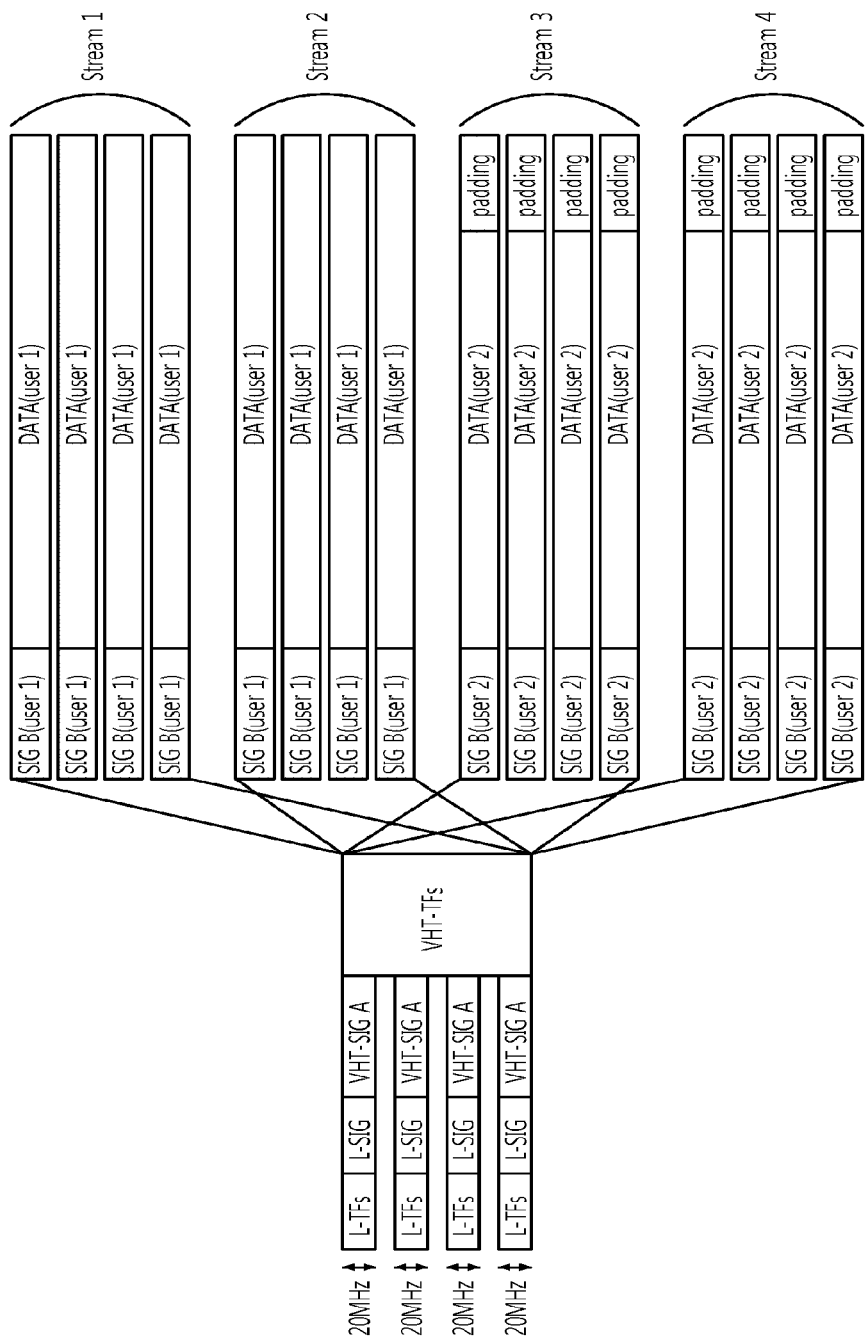
FIG. 2 shows an embodiment in which an access point (AP) transmits four streams through MU-MIMO beamforming by using four antennas in an 80 MHz frequency band and two stations (STA) receive the streams by using two antennas, respectively.

FIG. 2 shows an embodiment in which an access point (AP) transmits four streams through MU-MIMO beamforming by using four antennas in an 80 MHz frequency band and two stations (STA) receive the streams by using two antennas, respectively.

In the embodiment of FIG. 2, VHT-SIG A field, a common signal field, is iterated four times so as to be transmitted as one stream, and MU-MIMO is not applied to this transmission. In FIG. 2, the presence of the L-SIG field in front of VHT-SIG A field is to maintain backward compatibility with existing legacy equipment. A VHT-TF field is used to perform channel estimation in using MU-MIMO beamforming, and may have a resolvable or non-resolvable form.

VHT-SIG A includes common information commonly applied to two stations (STA). Also, VHT-SIG A, having a different structure from a signal field generated in legacy equipment, is used for auto-detection of VHT equipment. Here, VHT-SIG A is simply iteratively transmitted in units of 20 MHz frequency, whereby both an SNR gain and a frequency diversity gain can be obtained.

In comparison, VHT-SIG B, a dedicated-signal field, including information applied to each of the stations STA, is transmitted. Thus, VHT-SIG B is not required to be transmitted by using the simple iterative structure like the VHT-SIG A does. Also, even when VHT-SIG B is transmitted by using the simple iterative structure like VHT-SIG A, VHT-SIG B cannot obtain both an SNR gain and a frequency diversity gain.

In order to solve the problems, the present invention provides a method, apparatus, and a data field configuration capable of enhancing transmission efficiency by using a new method, rather than the simple iterative method like the existing VHT-SIG A field in transmitting the VHG-SIG B field.

Figure 3:
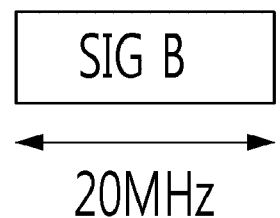
FIG. 3 shows the structure of a VHT-SIG B field when a station (STA) receives one stream in a 20 MHz frequency band.

FIG. 3 shows a structure of the VHT-SIG B field when a station (STA) receives one stream in a 20 MHz frequency band. Here, the VHT-SIG B (referred to as an 'SIG B', hereinafter) is modulated according to BPSK and has one OFDM symbol. In FIG. 3, since there is only one SIG B, it may be transmitted as it is.

Figure 4:
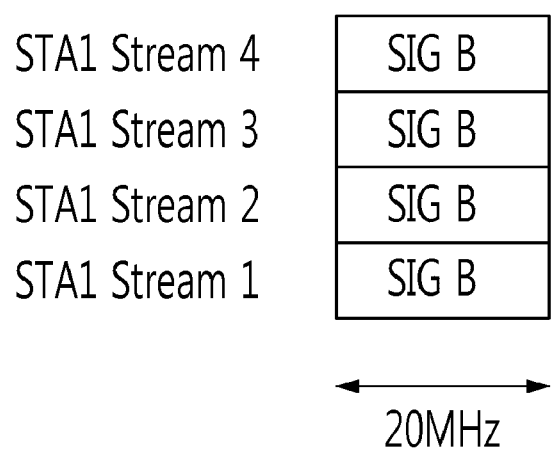
FIG. 4 shows the structure of a VHT-SIG B field when a station (STA) receives four streams in a 20 MHz frequency band.

FIG. 4 shows a structure of the VHT-SIG B field when a station (STA) receives four streams in a 20 MHz frequency band. In the embodiment of FIG. 4, four SIG Bs are transmitted. Here, in case in which the SIG B is transmitted in a simple iterative manner like the VHT-SIG A, if a channel environment of particular subcarriers of OFDM becomes worse in MU-MIMO beamforming, the iterative four bits are all placed in the same situation. Thus, an SNR gain according to the iteration four times may be obtained, but a frequency diversity effect cannot be obtained.

Thus, in an embodiment of the present invention, different interleaving is applied to the SIG Bs of the stream 1 to stream 4. When the same bits of a coded codeword of the SIG Bs is included in a different subcarrier of a different stream and transmitted, both the SNR gain and the frequency diversity gain can be obtained, improving transmission performance.

Figure 5:
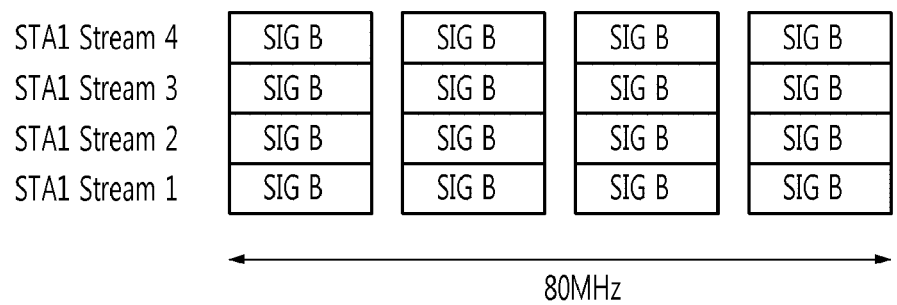
FIG. 5 shows the structure of a VHT-SIG B field when a station (STA) receives four streams in an 80 MHz frequency band.

FIG. 5 shows a structure of the VHT-SIG B field when a station (STA) receives four streams in an 80 MHz frequency band. In the embodiment of FIG. 5, although the SIG B is simply iterated in a frequency band, both the SNR gain and the frequency diversity gain can be obtained. Thus, maximum performance can be obtained by simply iterating the scheme applied to the four streams in the embodiment of FIG. 4.

The method described with reference to FIGS. 4 and 5 may be applied in the same manner to 40 MHz frequency band or 160 MHz band and when the number of streams is two or three.

Meanwhile, information included in the VHT-SIG B field is required to be stably transmitted compared with information included in the VHT-DATA field. Thus, in general, the VHT-SIG B field is transmitted by using a BPSK modulation and a low coding rate, or the like, thus being protected. Thus, the method described with reference to FIGS. 4 and 5 may protect the VHT-SIG B more than necessary.

In the case of VHT-SIG A, it must be necessarily recognized in units of 20 MHz at a receiver (or a receiving end). Thus, the VHT-SIG A must be iteratively transmitted by a corresponding symbol length regardless of the number of symbols. However, iteratively transmitting the VHT-SIG B by a corresponding symbol length may be problematic in terms of the foregoing transmission performance and efficiency.

Figure 6:
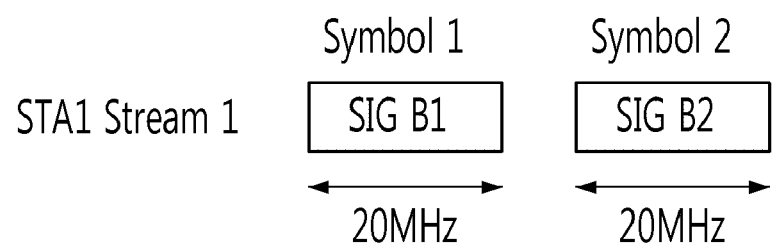
FIG. 6 shows the structure of a VHT-SIG B field having two symbols when a station (STA) receives one stream in a 20 MHz frequency band.

FIG. 6 shows a structure of the VHT-SIG B field having two symbols when a station (STA) receives one stream in a 20 MHz frequency band. In FIG. 6, the SIG B is modulated according to BPSK and has two OFDM symbols. Here, since there is only one SIG B, it may be transmitted as it is.

Figure 7:
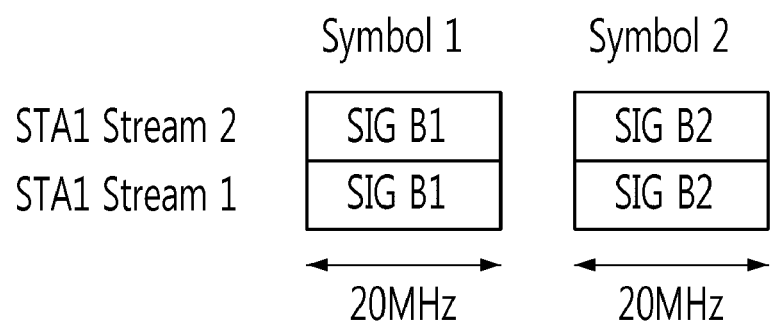
FIG. 7 shows the structure of a VHT-SIG B field having two symbols when a station (STA) receives four streams in a 20 MHz frequency band.

FIG. 7 shows a structure of a VHT-SIG B field having two symbols when a station (STA) receives four streams in a 20

MHz frequency band. Like the embodiment of FIG. 4, both SNR gain and frequency diversity gain can be obtained by applying different interleaving to streams.

However, if sufficient performance can be obtained without having to iterate the SIG B, the method of FIG. 7 may not be an effective transmission because the SIG B is transmitted over two symbols. Thus, the following transmission method is considered.

Figure 8:
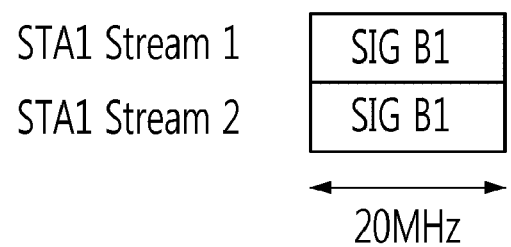
FIG. 8 shows the structure of a VHT-SIG B field having one symbol when a station (STA) receives four streams in a 20 MHz frequency band.

FIG. 8 shows a structure of the VHT-SIG B field having one symbol when a station (STA) receives four streams in a 20 MHz frequency band. In the embodiment of FIG. 8, the SIG B information, which has occupied two symbols when transmitted as one stream in the 20 MHz frequency band, can be effectively transmitted by only one symbol.

Figure 9:
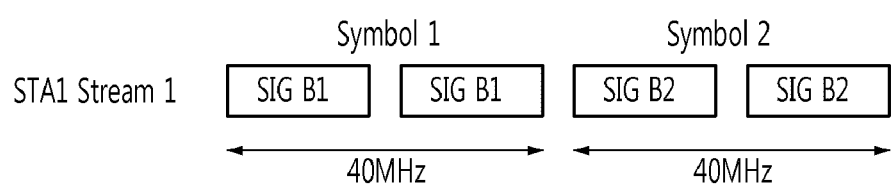
FIG. 9 shows an embodiment in which SIG Bs are transmitted over two symbols in a similar manner to that of a VHT-SIG A when a station (STA) receives one stream in a 40 MHz frequency band.

When the frequency band applied to a transmission of a data frame extends, a method similar to FIG. 8 may be considered. FIG. 9 shows an embodiment in which SIG Bs are transmitted over two symbols in a similar manner to that of a VHT-SIG A when a station (STA) receives one stream in a 40 MHz frequency band. In the embodiment of FIG. 9, since SIG Bs are transmitted over two symbols although sufficient performance can be obtained without iterating the SIG B, it is not effective.

Figure 10:
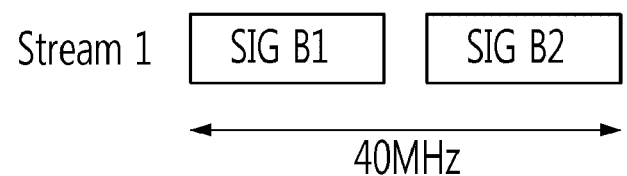
FIG. 10 shows the structure of a VHT-SIG B field having one symbol when a station (STA) receives one stream in a 40 MHz frequency band.

FIG. 10 shows a structure of the VHT-SIG B field having one symbol when a station (STA) receives one stream in a 40 MHz frequency band. In this case, the SIG B information, which has occupied two symbols when transmitted as one stream in the 40 MHz frequency band, can be effectively transmitted through one symbol.

In this manner, when the VHT-SIG B has two symbols when transmitted as one stream in the 20 MHz frequency band, even though the number of streams is increased or the frequency band extends, the VHT-SIG B can be effectively transmitted by using one symbol. Also, the foregoing methods may extend as follows.

Figure 11:
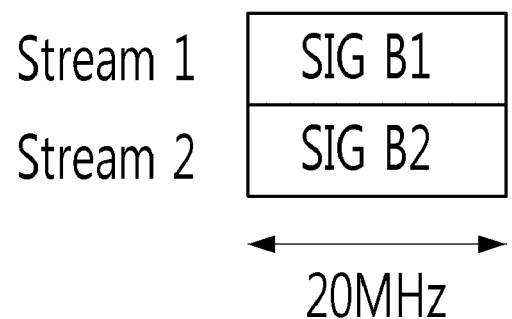
FIG. 11 shows an embodiment of applying a data transmission method according to the present invention to a case in which a station (STA) receives two streams in a 20 MHz frequency band.
Figure 12:
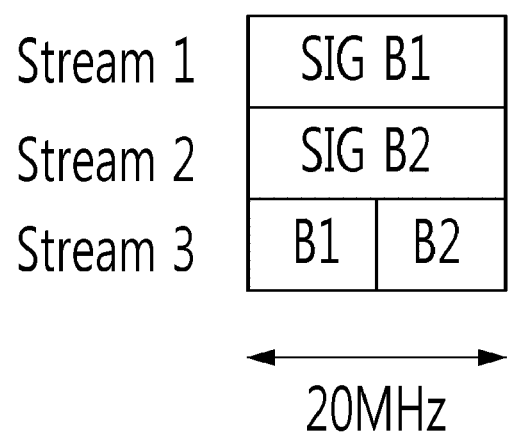
FIG. 12 shows an embodiment of applying the data transmission method according to the present invention to a case in which a station (STA) receives three streams in a 20 MHz frequency band.

FIG. 11 shows an embodiment of applying the data transmission method according to the present invention to a case in which a station (STA) receives two streams in a 20 MHz frequency band. FIG. 12 shows an embodiment of applying the data transmission method according to the present invention to a case in which a station (STA) receives three streams in a 20 MHz frequency band. In the embodiment of FIG. 12, stream 3 is configured of B1 corresponding to an even number bit of a codeword of the SIG B1 and B2 corresponding to an odd number bit of a codeword of SIG B2. The stream 3 transmitted thusly may be combined at a receiver.

Figure 13:
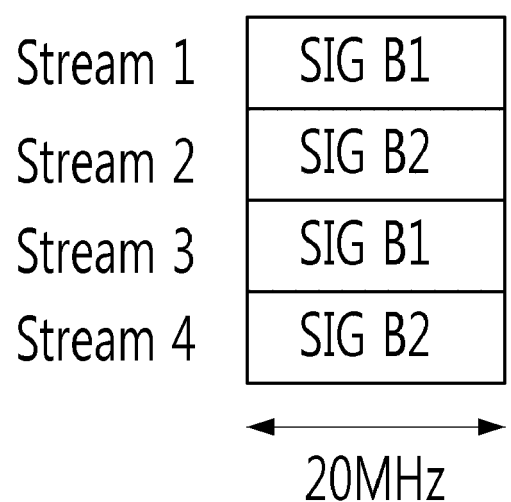
FIG. 13 shows an embodiment of applying the data transmission method according to the present invention to a case in which a station (STA) receives four streams in a 20 MHz frequency band.

FIG. 13 shows an embodiment of applying the data transmission method according to the present invention to a case in which a station (STA) receives four streams in a 20 MHz frequency band. In the embodiment of FIG. 13, SIG B1 is iterated in streams 1 and 3, and SIG B2 is iterated in streams 2 and 4. In this case, a simple iteration cannot obtain a frequency diversity gain, so different interleaving may be applied to each stream in order to enhance transmission performance as mentioned above.

Figure 14:
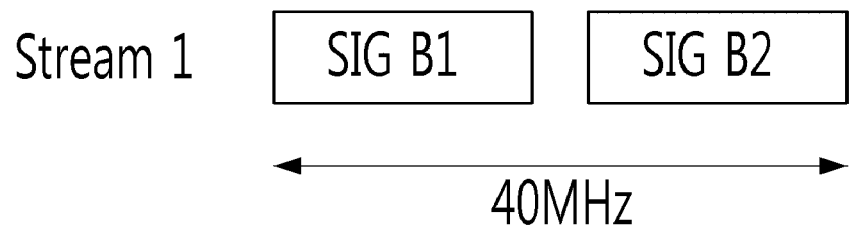
FIG. 14 shows an embodiment of applying the data transmission method according to the present invention to a case in which a station (STA) receives one stream in a 40 MHz frequency band.
Figure 15:
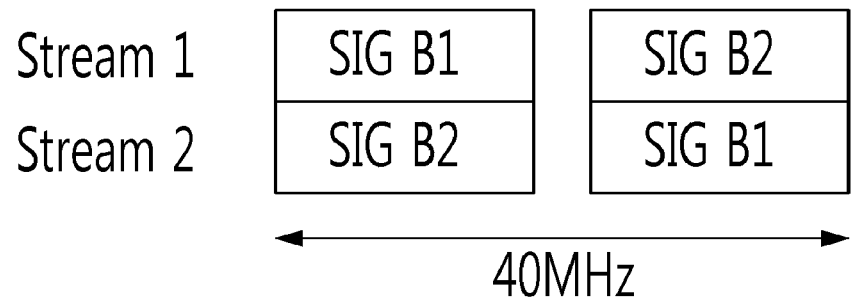
FIG. 15 shows an embodiment of applying the data transmission method according to the present invention to a case in which a station (STA) receives two streams in a 40 MHz frequency band.
Figure 16:
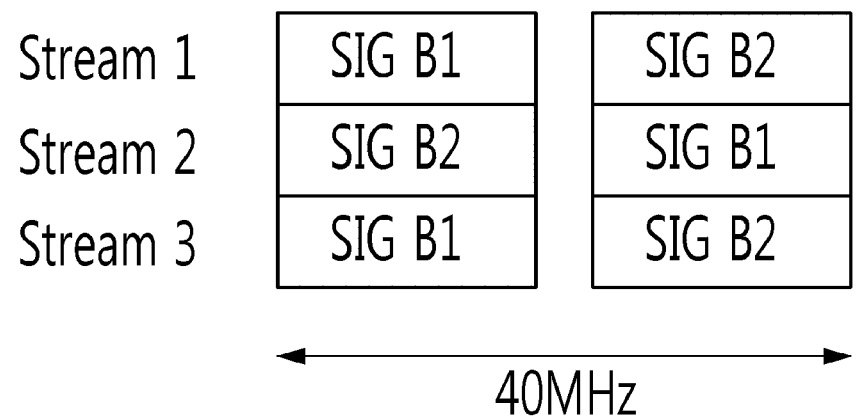
FIG. 16 shows an embodiment of applying the data transmission method according to the present invention to a case in which a station (STA) receives three streams in a 40 MHz frequency band.

FIG. 14 shows an embodiment of applying the data transmission method according to the present invention to a case in which a station (STA) receives one stream in a 40 MHz frequency band. FIG. 15 shows an embodiment of applying the data transmission method according to the present invention to a case in which a station (STA) receives two streams in a 40 MHz frequency band. FIG. 16 shows an embodiment of applying the data transmission method according to the present invention to a case in which a station (STA) receives three streams in a 40 MHz frequency band. Different interleaving may be applied to each stream of FIGS. 14, 15, and 16.

Figure 17:
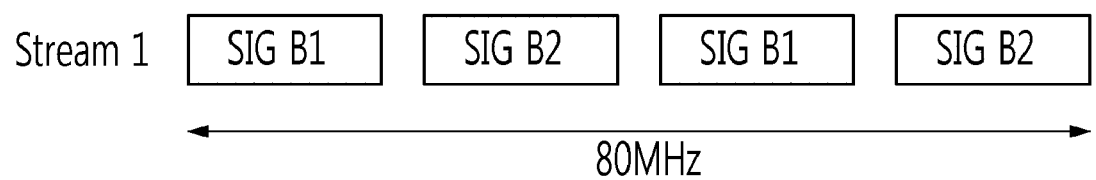
FIG. 17 shows an embodiment of applying the data transmission method according to the present invention to a case in which a station (STA) receives one stream in an 80 MHz frequency band.
Figure 18:
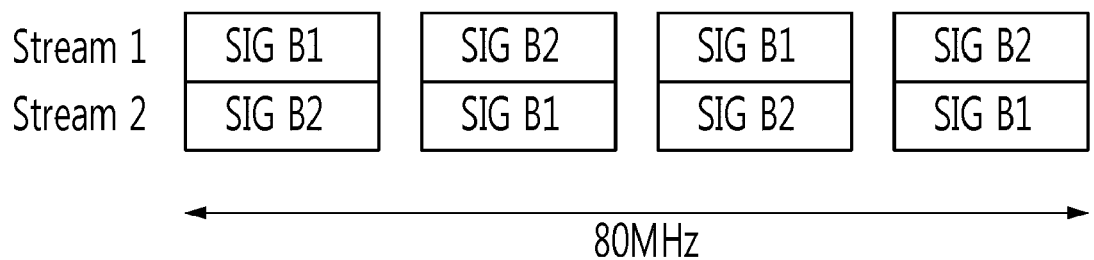
FIG. 18 shows an embodiment of applying the data transmission method according to the present invention to a case in which a station (STA) receives two streams in an 80 MHz frequency band.
Figure 19:
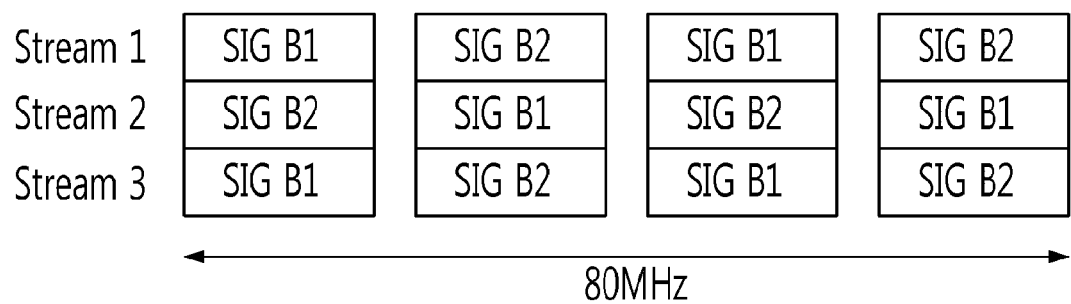
FIG. 19 shows an embodiment of applying the data transmission method according to the present invention to a case in which a station (STA) receives three streams in an 80 MHz frequency band.
Figure 20:
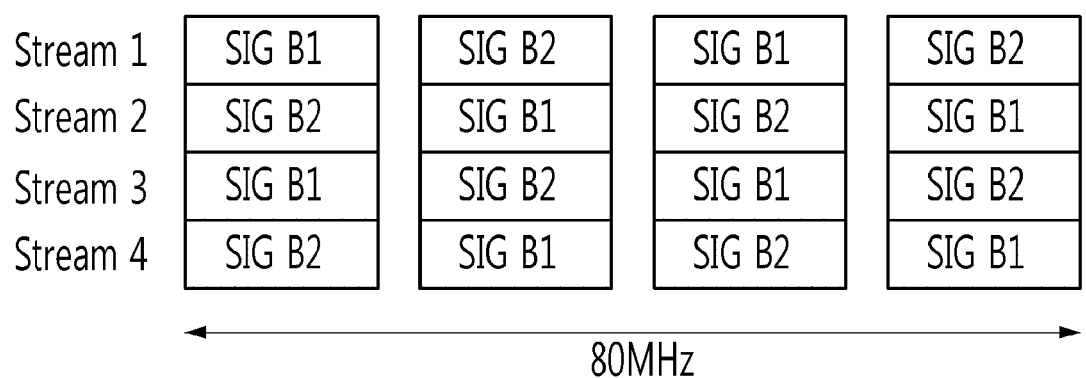
FIG. 20 shows an embodiment of applying the data transmission method according to the present invention to a case in which a station (STA) receives four streams in an 80 MHz frequency band.

FIG. 17 shows an embodiment of applying the data transmission method according to the present invention to a case in which a station (STA) receives one stream in an 80 MHz frequency band. FIG. 18 shows an embodiment of applying the data transmission method according to the present invention to a case in which a station (STA) receives two streams in an 80 MHz frequency band. FIG. 19 shows an embodiment of applying the data transmission method according to the present invention to a case in which a station (STA) receives three streams in an 80 MHz frequency band. FIG. 20 shows an embodiment of applying the data transmission method according to the present invention to a case in which a station (STA) receives four streams in an 80 MHz frequency band. Different interleaving may be applied to each stream of FIGS. 17, 18, 19, and 20.

Figure 21:
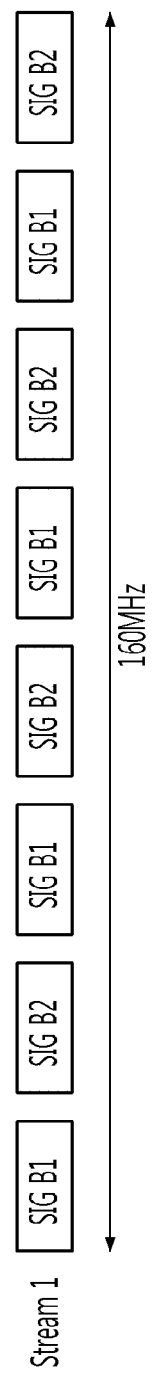
FIG. 21 shows an embodiment of applying the data transmission method according to the present invention to a case in which a station receives one stream in a 160 MHz frequency band.
Figure 22:
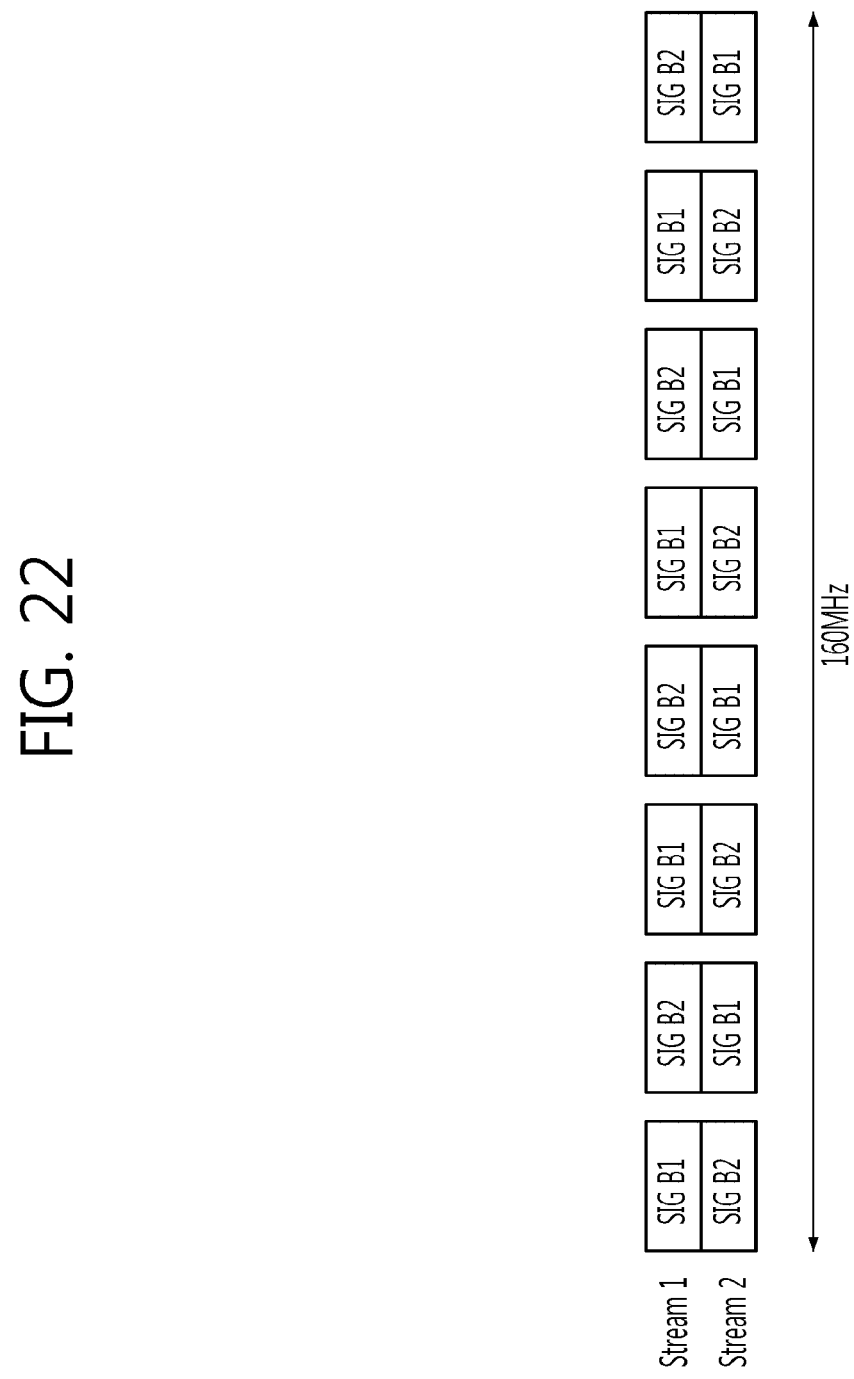
FIG. 22 shows an embodiment of applying the data transmission method according to the present invention to a case in which a station receives two streams in a 160 MHz frequency band.
Figure 23:
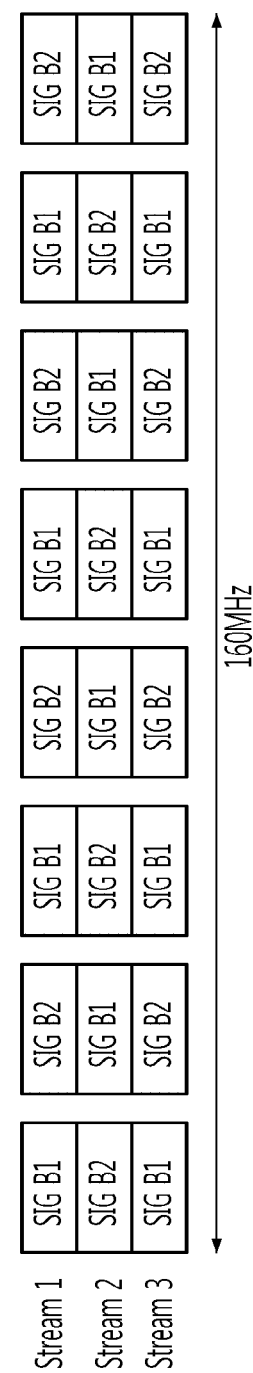
FIG. 23 shows an embodiment of applying the data transmission method according to the present invention to a case in which a station receives three streams in a 160 MHz frequency band.
Figure 24:
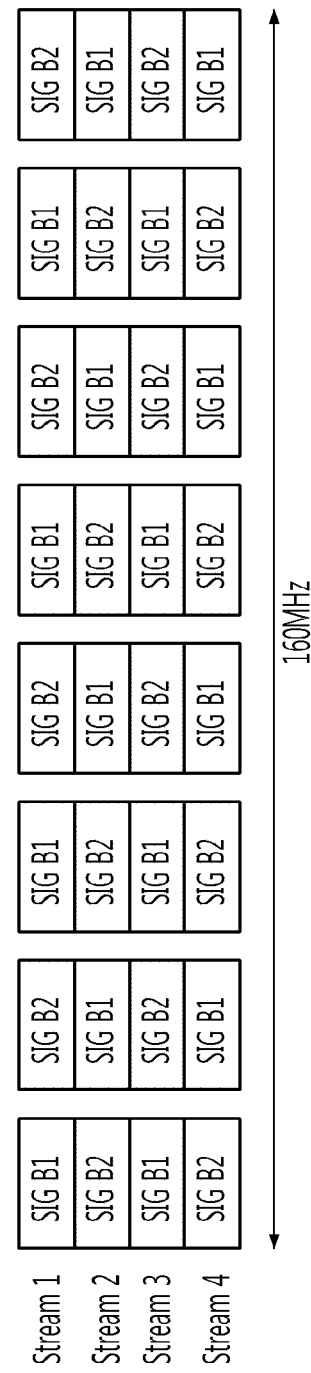
FIG. 24 shows an embodiment of applying the data transmission method according to the present invention to a case in which a station receives four streams in a 160 MHz frequency band.

FIG. 21 shows an embodiment of applying the data transmission method according to the present invention to a case in which a station (STA) receives one stream in a 160 MHz frequency band. FIG. 22 shows an embodiment of applying the data transmission method according to the present invention to a case in which a station (STA) receives two streams in a 160 MHz frequency band. FIG. 23 shows an embodiment of applying the data transmission method according to the present invention to a case in which a station (STA) receives three streams in a 160 MHz frequency band. FIG. 24 shows an embodiment of applying the data transmission method according to the present invention to a case in which a station (STA) receives four streams in a 160 MHz frequency band. Different interleaving may be applied to each stream of FIGS. 21, 22, 23, and 24.

The transmission method according to an embodiment of the present invention as described above can be applicable when a data frame is transmitted by using a multi-channel. FIG. 25 shows an embodiment of applying the data transmission method according to the present invention to a case in which data is transmitted via two non-contiguous multi-channels in an 80 MHz frequency band. FIG. 26 shows an embodiment of applying the data transmission method according to the present invention to a case in which data is transmitted via three non-contiguous multi-channels in an 80 MHz frequency band. Different interleaving may be applied to each stream of FIGS. 25 and 26.

Figure 28:
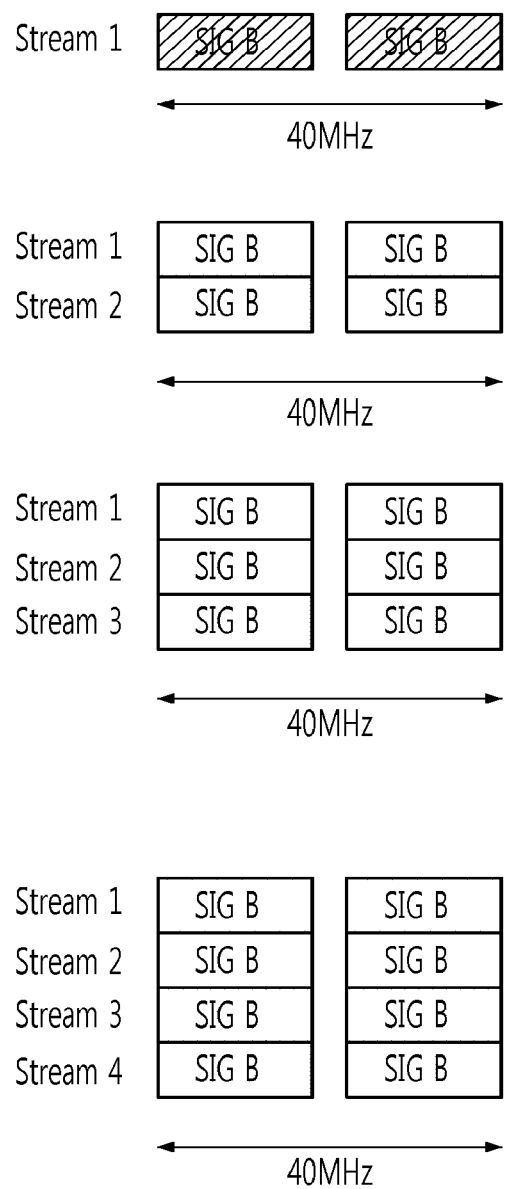
FIG. 28 shows an embodiment of applying the data transmission method according to the present invention to a case in which data is transmitted by using one QPSK symbol in a 40 MHz frequency band.
Figure 29:
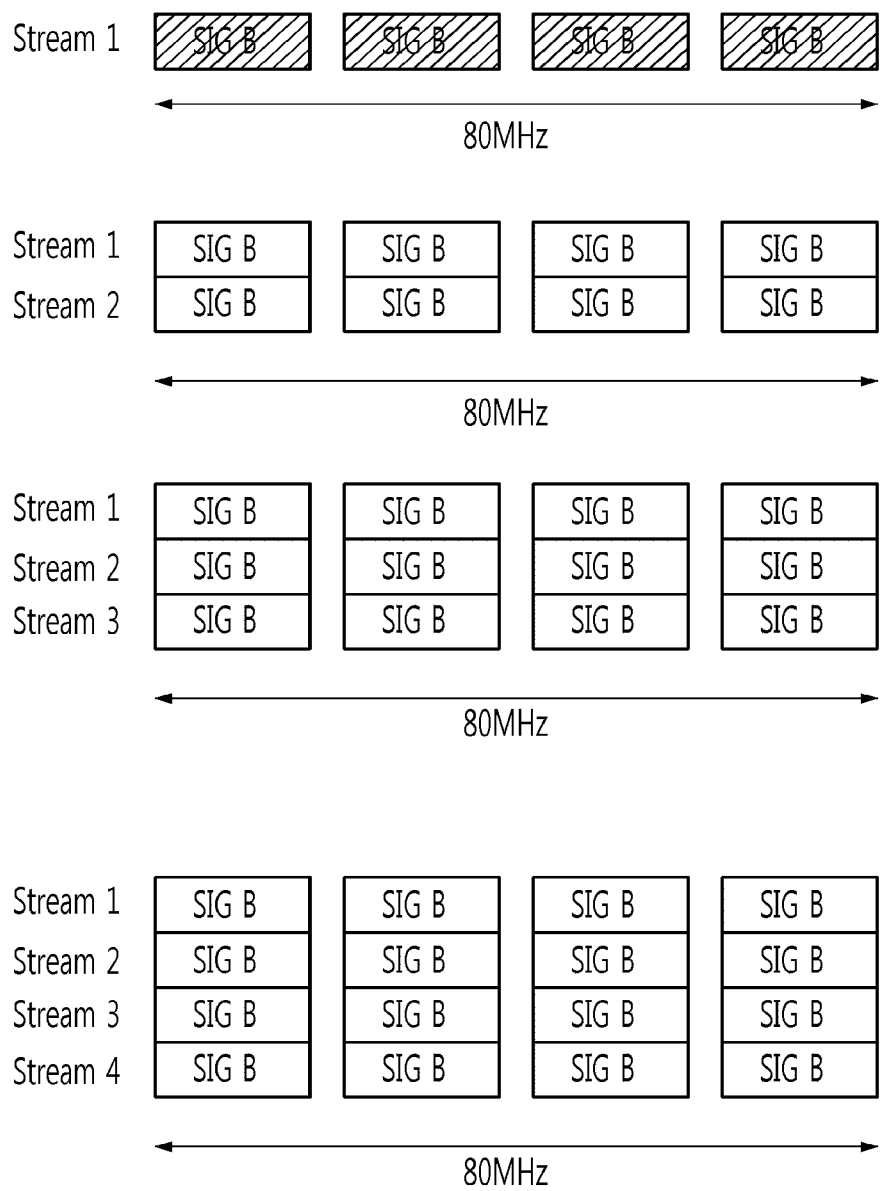
FIG. 29 shows an embodiment of applying the data transmission method according to the present invention to a case in which data is transmitted by using one QPSK symbol in an 80 MHz frequency band.
Figure 30:
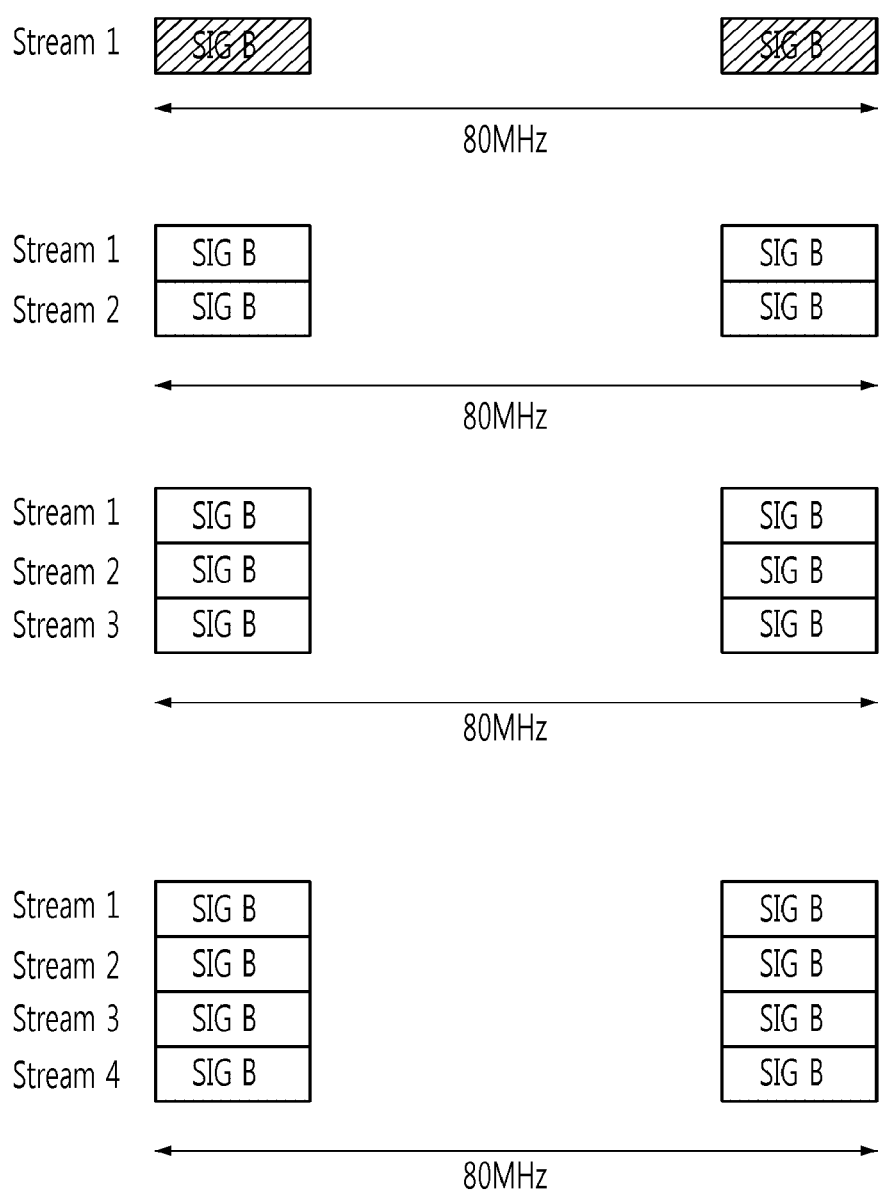
FIG. 30 shows an embodiment of applying the data transmission method according to the present invention to a case in which data is transmitted via two non-contiguous multi-channels by using one QPSK symbol in an 80 MHz frequency band.
Figure 31:
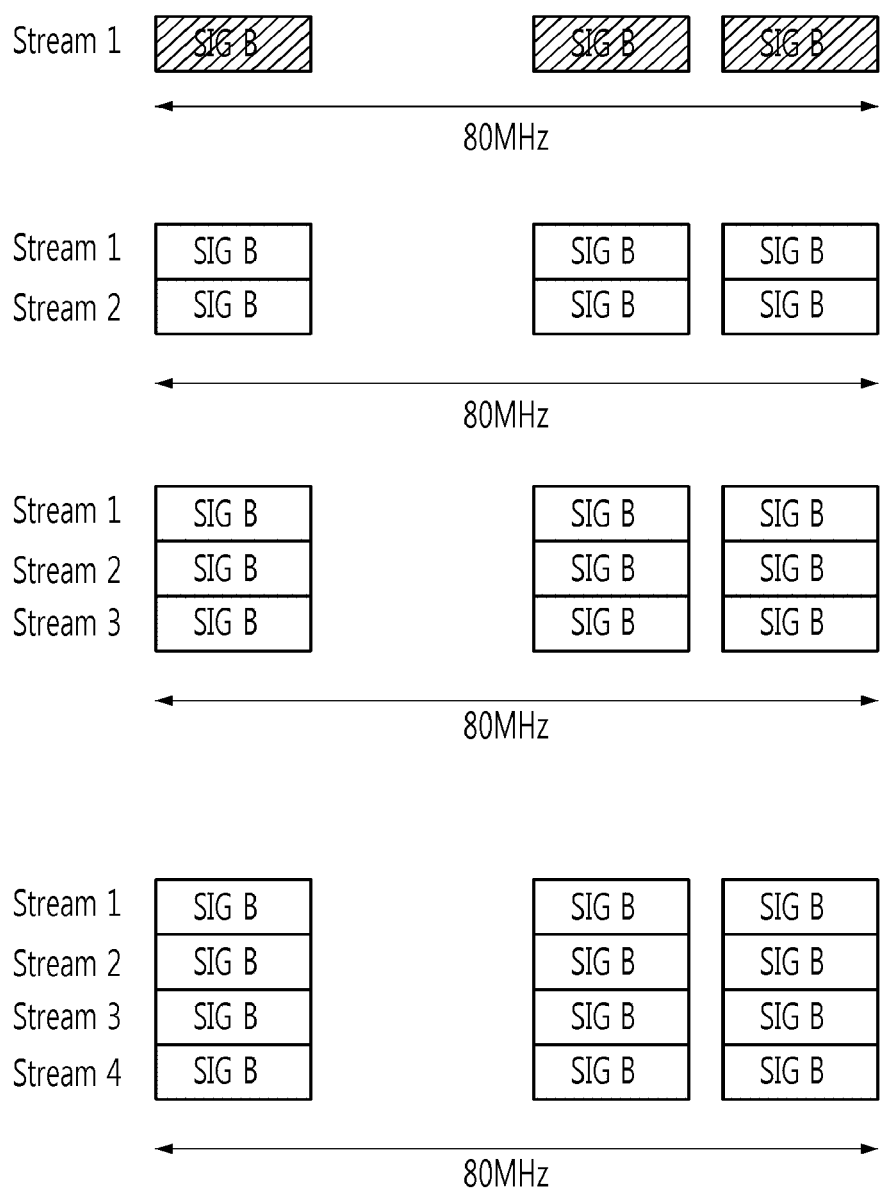
FIG. 31 shows an embodiment of applying the data transmission method according to the present invention to a case in which data is transmitted via three non-contiguous multi-channels by using one QPSK symbol in an 80 MHz frequency band.

The transmission method according to an embodiment of the present invention as described above can be applicable when the VHT-SIG B field uses one QPSK symbol instead of two BPSK symbols. FIG. 27 shows an embodiment of applying the data transmission method according to the present invention to a case in which data is transmitted by using one QPSK symbol in a 20 MHz frequency band. FIG. 28 shows an embodiment of applying the data transmission method according to the present invention to a case in which data is transmitted by using one QPSK symbol in a 40 MHz frequency band. FIG. 29 shows an embodiment of applying the data transmission method according to the present invention to a case in which data is transmitted by using one QPSK symbol in an 80 MHz frequency band. FIG. 30 shows an embodiment of applying the data transmission method according to the present invention to a case in which data is transmitted via two non-contiguous multi-channels by using one QPSK symbol in an 80 MHz frequency band. FIG. 31 shows an embodiment of applying the data transmission method according to the present invention to a case in which data is transmitted via three non-contiguous multi-channels by using one QPSK symbol in an 80 MHz frequency band.

Different interleaving may be applied to each stream of FIGS. 27, 28, 29, 30, and 31.

The transmission method according to an embodiment of the present invention as described above can be applicable when one stream is transmitted as a space-time block code (STBC) (or an Alamouti code) through two antennas. In this case, the VHT-SIG B field may be transmitted as the STBC in the same manner as that of the data field, or the VHT-SIG B field may be transmitted by using one of two space-time streams. In the former case, STBC-related information should be included in the VHT-SIG A in advance and transmitted, and in the latter case, the STBC-related information may be included in the VHT-SIG B and transmitted.

Figure 32:
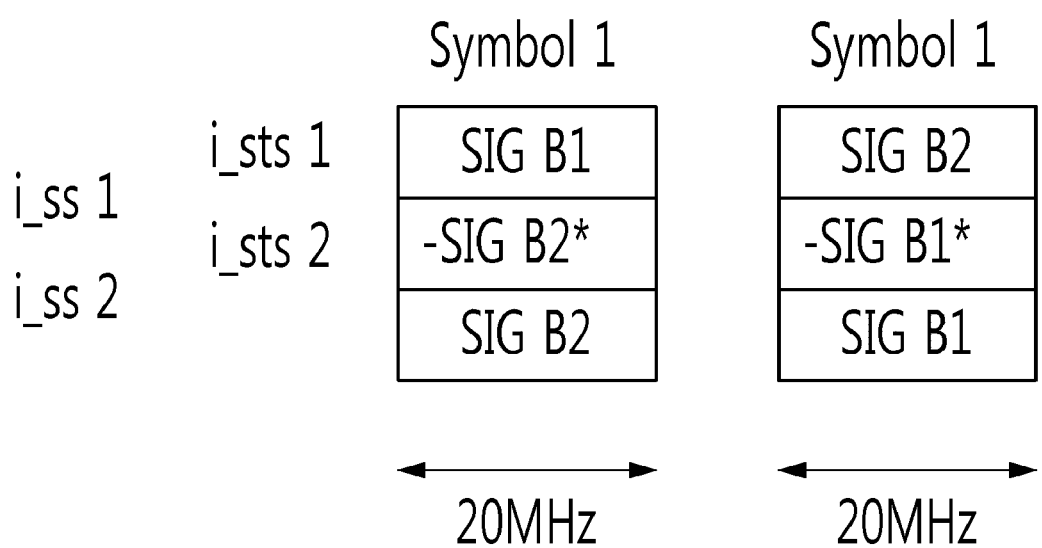
FIG. 32 shows an embodiment of applying the data transmission method according to the present invention to a case in which a first stream is transmitted by using two space-time streams and a second stream is transmitted as it is in a 20 MHz frequency band.
Figure 33:
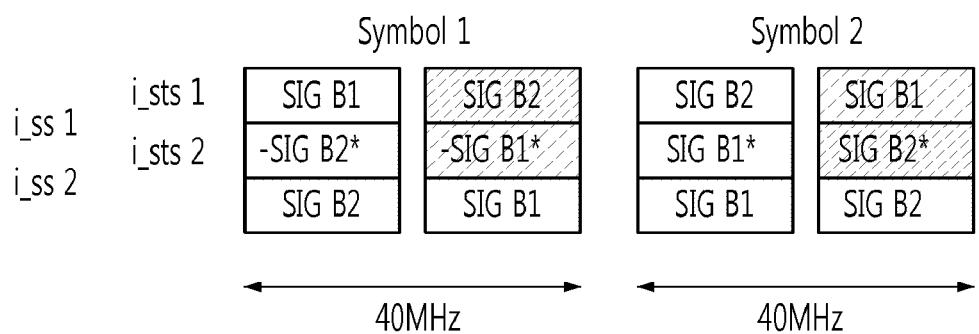
FIG. 33 shows an embodiment of applying the data transmission method according to the present invention to a case in which a first stream is transmitted by using two space-time streams and a second stream is transmitted as it is in a 40 MHz frequency band.

FIG. 32 shows an embodiment of applying the data transmission method according to the present invention to a case in which a first stream is transmitted by using two space-time streams and a second stream is transmitted as it is in a 20 MHz frequency band. FIG. 33 shows an embodiment of applying a data transmission method according to the present invention to a case in which a first stream is transmitted by using two space-time streams and a second stream is transmitted as it is in a 40 MHz frequency band.

Figure 34:
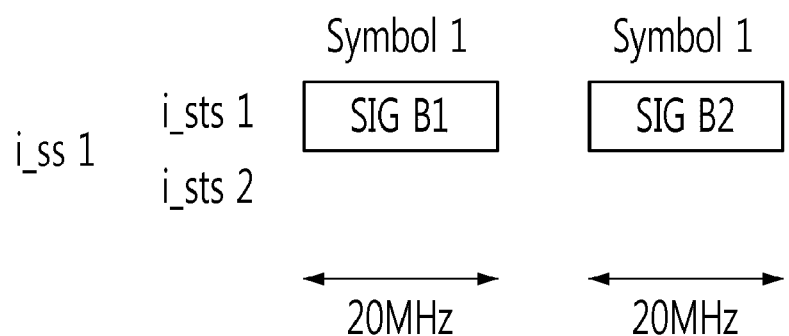
FIG. 34 shows an embodiment of applying the data transmission method according to the present invention to a case in which one stream is transmitted by using two space-time streams in a 20 MHz frequency band.
Figure 35:
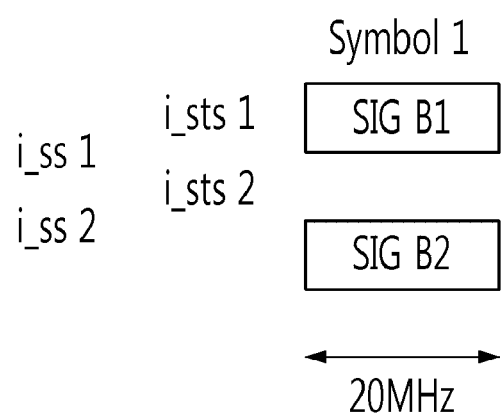
FIG. 35 shows an embodiment of applying the data transmission method according to the present invention to a case in which a first stream is transmitted by using two space-time streams and a second stream is transmitted as it is in a 20 MHz frequency band.
Figure 36:
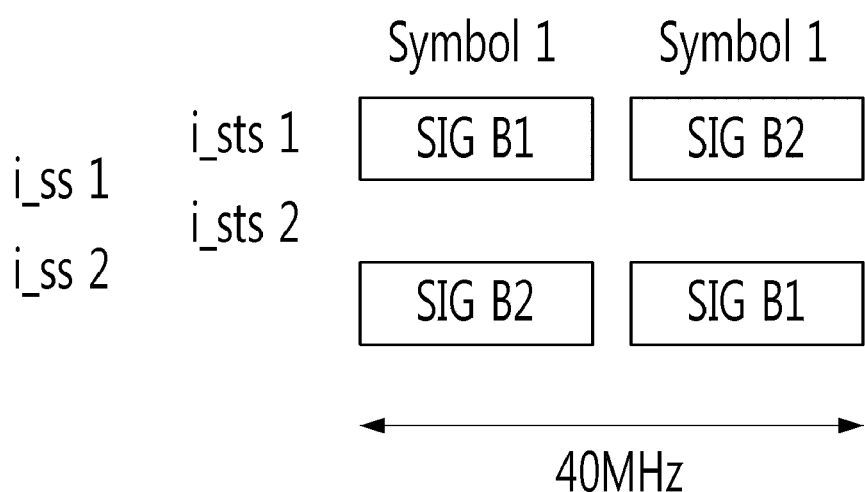
FIG. 36 shows an embodiment of applying the data transmission method according to the present invention to a case in which a first stream is transmitted by using two space-time streams and a second stream is transmitted as it is in a 40 MHz frequency band.

FIG. 34 shows an embodiment of applying the data transmission method according to the present invention to a case in which one stream is transmitted by using two space-time streams in a 20 MHz frequency band. FIG. 35 shows an embodiment of applying the data transmission method according to the present invention to a case in which a first stream is transmitted by using two space-time streams and a second stream is transmitted as it is in a 20 MHz frequency band. FIG. 36 shows an embodiment of applying the data transmission method according to the present invention to a case in which a first stream is transmitted by using two space-time streams and a second stream is transmitted as it is in a 40 MHz frequency band. In the embodiment of FIG. 36, the streams can be effectively transmitted by using one symbol.

The data transmission method according to an embodiment of the present invention as described above may also be applicable when only a portion of a stream is transmitted by using the STBC. The data transmission method according to an embodiment of the present invention as described above may also be applicable when the VHT-SIG B uses three or more OFDM symbols in transmitting one stream in a 20 MHz band.

A data transmission and reception method according to another embodiment of the present invention will now be described.

As described above, in an embodiment of the present invention, a dedicated signal field is iteratively effectively transmitted in a frequency or stream domain, to thus obtain a maximum diversity gain. This method can be applicable to a case in which a frame is transmitted by using channel bonding in a 40 MHz or 80 MHz bandwidth.

When two 20 MHz frequency bands are bonded to form a 40 MHz frequency band, a portion of a frequency tone, which is generally used as a guard band, or the like, can be used as a frequency tone for a data transmission. For example, in the case of 802.11n, the number of data transmission frequency tones in the 20 MHz band is 52, and the number of data transmission frequency tones in the 40 MHz band is 108. Namely, in 802.11n, the use of channel bonding results in an increase in the number of four data transmission frequency tones in the 40 MHz band. Thus, the number of transmission frequency tones can be further increased in an 80 MHz band by using channel bonding based on the same principle.

The foregoing VHT-SIG B field transmission scheme of the present invention can be applicable to a frame transmission using channel bonding. Here, the increased data transmission frequency tones can be used to increase the amount of data included in a signal field or the iteration number of signal fields. Namely, the method according to the present invention can be applicable even to a case in which the number of bits of the SIG B in the 40 MHz band or the 80 MHz band is greater than the number of bits of the SIG B in the 20 MHz band.

Figure 37:
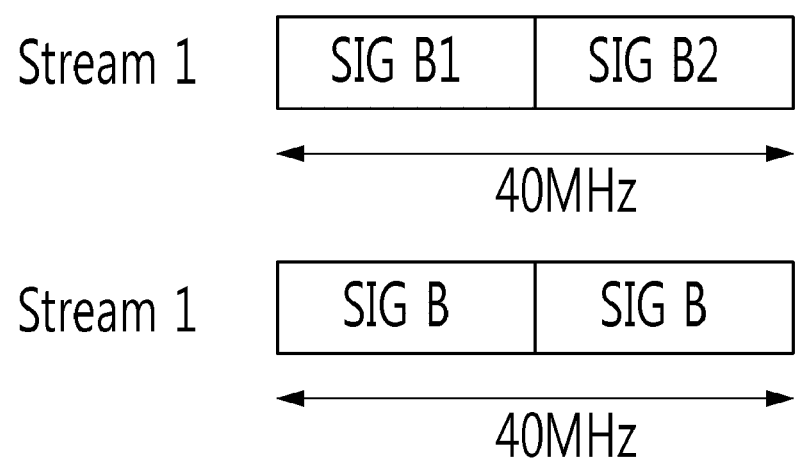
FIG. 37 shows an embodiment of applying the data transmission method according to the present invention to a case in which a station (STA) receives one stream in a 40 MHz frequency band.
Figure 38:
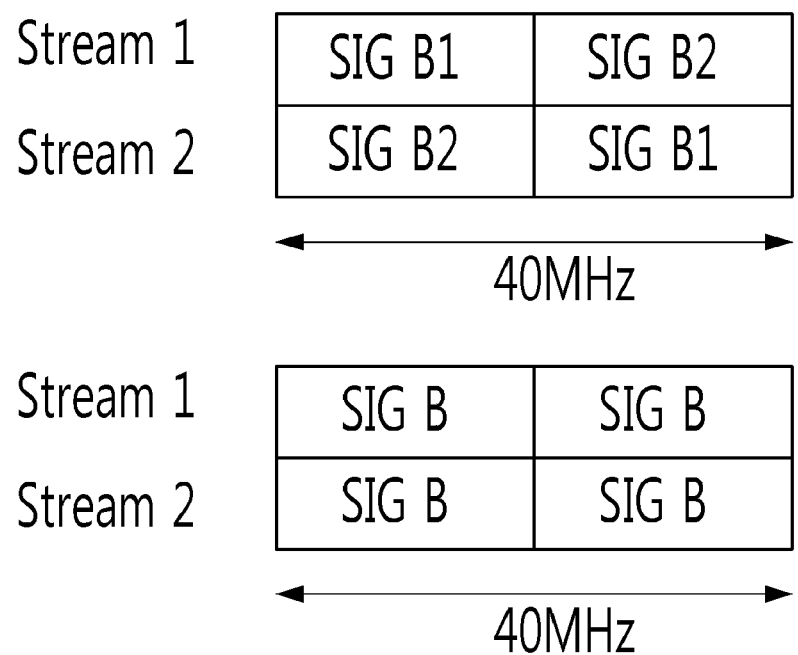
FIG. 38 shows an embodiment of applying a data transmission method according to the present invention to a case in which a station (STA) receives two streams in a 40 MHz frequency band.

FIG. 37 shows an embodiment of applying the data transmission method according to the present invention to a case in which a station (STA) receives one stream in a 40 MHz frequency band. FIG. 38 shows an embodiment of applying the data transmission method according to the present invention to a case in which a station (STA) receives two streams in a 40 MHz frequency band. FIG. 39 shows an embodiment of applying the data transmission method according to the present invention to a case in which a station (STA) receives three streams in a 40 MHz frequency band. FIG. 40 shows an embodiment of applying the data transmission method according to the present invention to a case in which a station (STA) receives four streams in a 40 MHz frequency band. Different interleaving may be applied to each stream of FIGS. 37, 38, 39, and 40.

Figure 41:
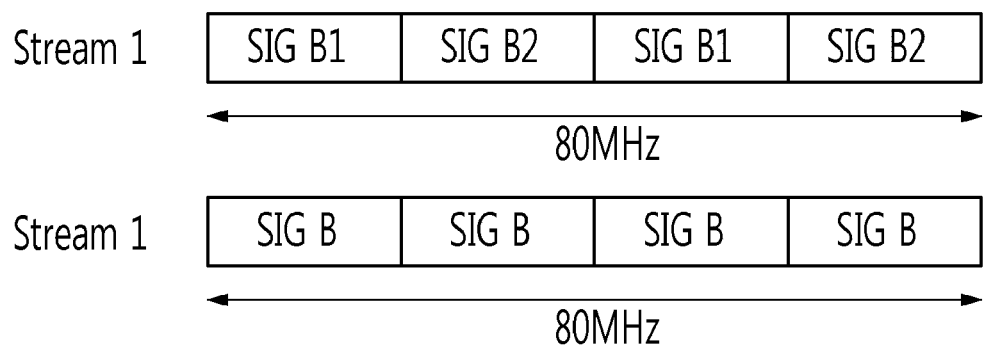
FIG. 41 shows an embodiment of applying the data transmission method according to the present invention to a case in which a station (STA) receives one stream in an 80 MHz frequency band.

FIG. 41 shows an embodiment of applying the data transmission method according to the present invention to a case in which a station (STA) receives one stream in an 80 MHz frequency band. FIG. 42 shows an embodiment of applying the data transmission method according to the present invention to a case in which a station (STA) receives two streams in an 80 MHz frequency band. FIG. 43 shows an embodiment of applying the data transmission method according to the present invention to a case in which a station (STA) receives three streams in an 80 MHz frequency band. FIG. 44 shows an embodiment of applying the data transmission method according to the present invention to a case in which a station (STA) receives four streams in an 80 MHz frequency band. Different interleaving may be applied to each stream of FIGS. 41, 42, 43, and 44.

When the number of bits of the SIG B and the number of frequency tones used in transmission are not in a mutually multiple relationship, some frequency tones may remain after iterating the SIG B. In this case, a method of iterating only a portion of the SIG B or padding may be used. This method can be applicable when the information of SIG B is increased according to an increase in the frequency bandwidth from 20 MHz to 40 MHz and to 80 MHz.

In general, when the frequency bandwidth is increased, the amount of data transmitted in the same duration is increased. Accordingly, when length information of transmitted data, or the like, is included in the VHT-SIG B and transmitted, the length of the VHT-SIG B itself is increased. In this case, a bit allocation of the VHT-SIG B is changed by frequency bandwidth and the VHT-SIG B may be iterated according to the number of transmittable frequency tones, thus enhancing transmission efficiency. For example, it is assumed that the number of available data tones in a 20 MHz band is 26 bits, the number of available data tones in a 40 MHz band is 54 bits, and the number of available data tones in an 80 MHz band is 117 bits. In this case, the length of the VHT-SIG B is 26 bits in the 20 MHz band, 27 bits in the 40 MHz band, and 29 bits in the 80 MHz band. FIG. 45 shows a bit allocation in this case.

Figure 46:
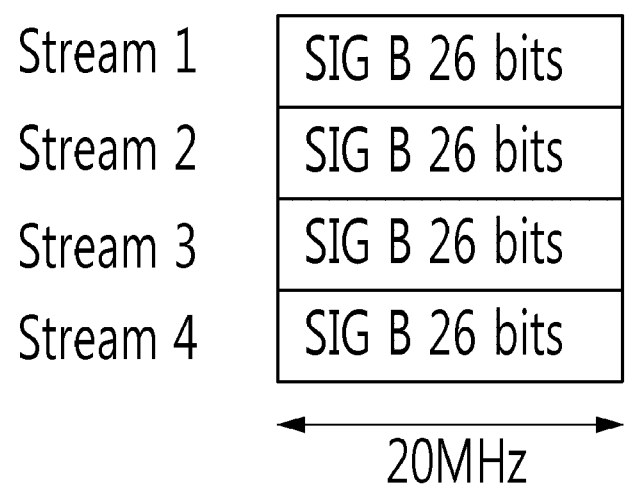
FIG. 46 shows an embodiment of applying the data transmission method according to the present invention to a case in which a station (STA) receives four streams in a 20 MHz frequency band, when the numbers of bits of the VHT-SIG B are allocated as shown in FIG. 45.

FIG. 46 shows an embodiment of applying the data transmission method according to the present invention to a case in which a station (STA) receives four streams in a 20

Figure 47:
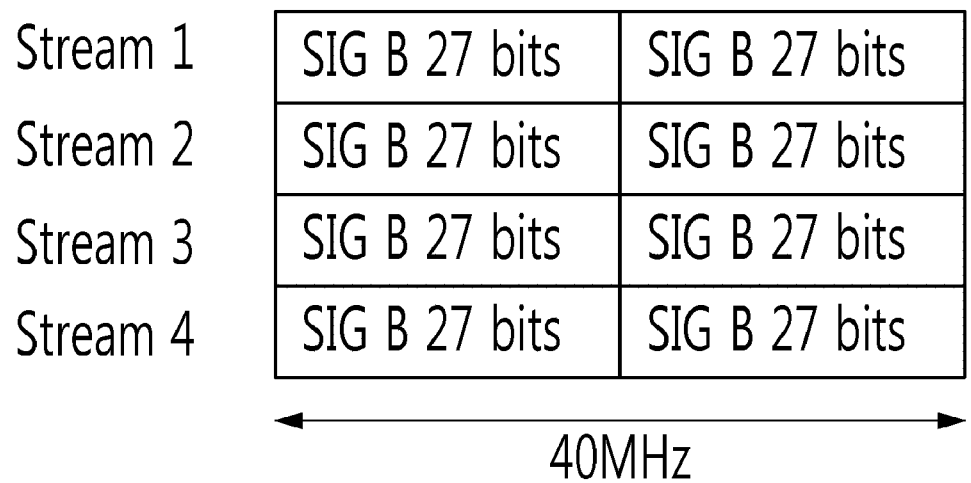
FIG. 47 shows an embodiment of applying the data transmission method according to the present invention to a case in which a station (STA) receives four streams in a 40 MHz frequency band, when the numbers of bits of the VHT-SIG B are allocated as shown in FIG. 45.

MHz frequency band, when the numbers of bits of the VHT-SIG B are allocated as shown in FIG. 45. FIG. 47 shows an embodiment of applying the data transmission method according to the present invention to a case in which a station (STA) receives four streams in a 40 MHz frequency band, when the numbers of bits of the VHT-SIG B are allocated as shown in FIG. 45. FIG. 48 shows an embodiment of applying the data transmission method according to the present invention to a case in which a station (STA) receives four streams in an 80 MHz frequency band, when the numbers of bits of the VHT-SIG B are allocated as shown in FIG. 45. Different interleaving may be applied to each stream of FIGS. 46, 47, and 48. The present invention can be applicable even when the number of transmitted streams is changed in the embodiments of FIGS. 46, 47, and 48.

The bit allocation of VHT-SIG B in FIG. 45 includes tail bits for a convolutional code. However, the VHT-SIG B of FIG. 45 does not include CRC bits for determining whether or not a codeword has an error, making it difficult to obtain reliability of data. However, in the case of 20 MHz band, since there is no extra bit in the VHT-SIG B, some (4 to 8 bits) of the reserved bits included in a service field of a data field may be used as the CRC bit as shown in FIG. 49.

Figure 49:
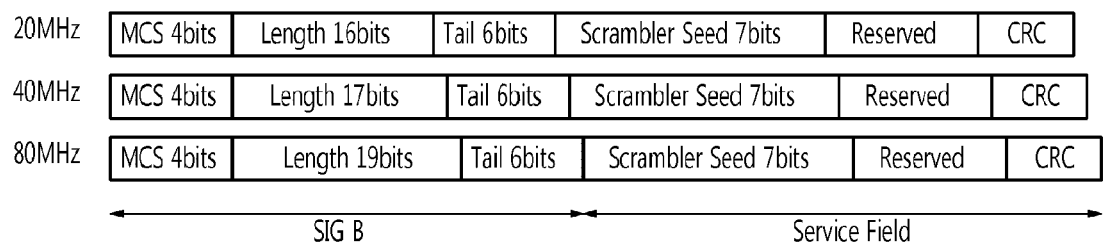
FIG. 49 shows an embodiment in which the VHT-SIG B has a length of 26 bits in a 20 MHz band, 27 bits in a 40 MHz band, and 29 bits in an 80 MHz band, and some of the reserved bits included in a service field are used as CRC bits.

When the bit allocation as shown in FIG. 49 is used, the CRC is simultaneously applied to the SIG B and a scrambler seed. Thus, CRC calculation with respect to a variable length is required for each frequency band. The VHT-SIG B field uses a low modulations scheme and coding rate (BPSK 1/2), and is available for an iterative coding to frequency and an antenna domain, so it has high reliability. Meanwhile, the service field uses the modulation scheme and coding rate used for transmission of data, as it is, so its reliability is relatively variable and generally has low reliability compared with the VHT-SIG B. In this case, the use of a CRC can detect an error of information included in the VHT-SIG B field and an error of a scrambler seed. Thus, when an error of the scrambler seed is detected, the operation of PHY and MAC layers can be stopped, obtaining an effect of reducing power consumption.

The foregoing method can be applicable to SU-MIMO. In SU-MIMO, the VHT-SIG A may relatively have extra bits. Thus, in SU-MIMO, the MCS bits, which are included in the VHT-SIG B field, can be included in the VHT-SIG A field. In SU-MIMO, the number of antennas in use may be increased, so the number of bits of the field indicating a data length may be increased. FIG. 50 shows a bit allocation of the VHT-SIG B when the VHT-SIG B has a length of 26 bits in a 20 MHz band, 27 bits in a 40 MHz band, and 29 bits in a 80 MHz band in SU-MIMO.

Figure 51:
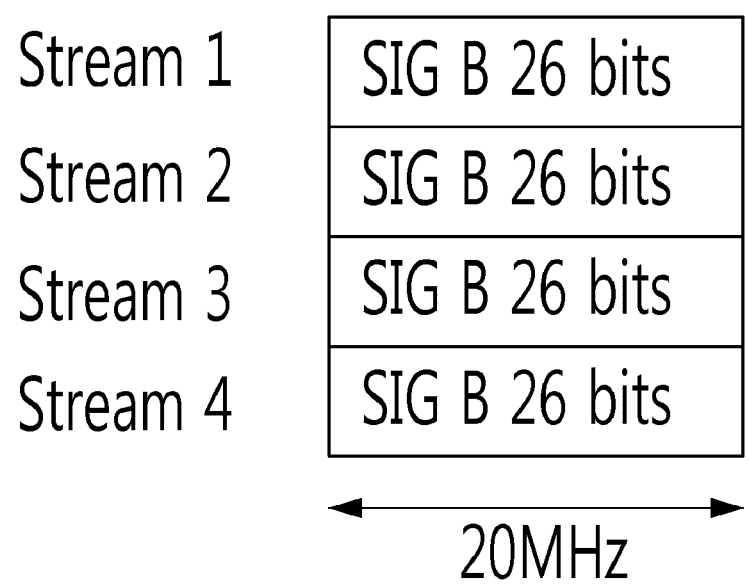
FIG. 51 shows an embodiment of applying the data transmission method according to the present invention to a case in which a station (STA) receives four streams in a 20 MHz frequency band, when the numbers of bits of the VHT-SIG B are allocated as shown in FIG. 50.
Figure 52:
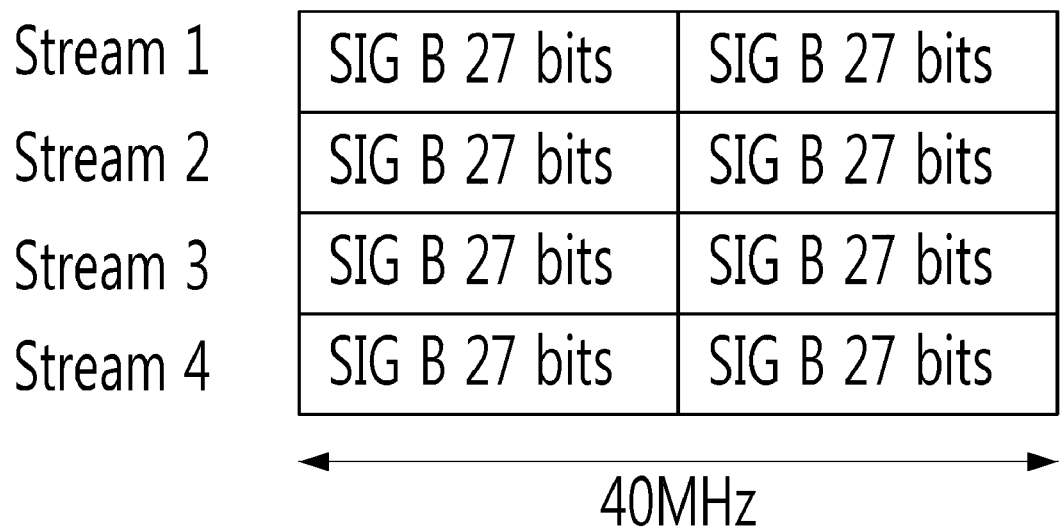
FIG. 52 shows an embodiment of applying the data transmission method according to the present invention to a case in which a station (STA) receives four streams in a 40 MHz frequency band, when the numbers of bits of the VHT-SIG B are allocated as shown in FIG. 50.

FIG. 51 shows an embodiment of applying a data transmission method according to the present invention to a case in which a station (STA) receives four streams in a 20 MHz frequency band, when the numbers of bits of the VHT-SIG B are allocated as shown in FIG. 50. FIG. 52 shows an embodiment of applying a data transmission method according to the present invention to a case in which a station (STA) receives four streams in a 40 MHz frequency band, when the numbers of bits of the VHT-SIG B are allocated as shown in FIG. 50. FIG. 53 shows an embodiment of applying a data transmission method according to the present invention to a case in which a station (STA) receives four streams in an 80 MHz frequency band, when the numbers of bits of the VHT-SIG B are allocated as shown in FIG. 50. Different interleaving may be applied to each stream of FIGS. 51, 52, and 53. The present invention can be applicable even when the number of transmitted streams is changed in the embodiments of FIGS. 51, 52, and 53.

When the bit allocation of VHT-SIG B field as shown in FIG. 50 is used, the VHT-SIG B field includes tail bits for a convolutional code. However, the VHT-SIG B of FIG. 50 does not include a CRC bits for determining whether or not a codeword has an error, making it difficult to obtain reliability of data. However, in the case of 20 MHz band, since there is no extra bit in the VHT-SIG B, some (4 to 8 bits) of the reserved bits included in a service field of a data field may be used as the CRC bit as shown in FIG. 54.

Figure 54:
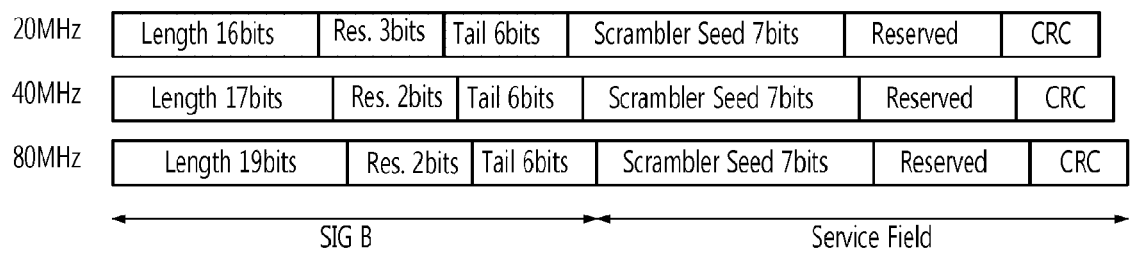
FIG. 54 shows an embodiment in which the VHT-SIG B has a length of 26 bits in a 20 MHz band, 27 bits in a 40 MHz band, and 29 bits in an 80 MHz band, and some of the reserved bits included in a service field are used as CRC bits.

When the bit allocation as shown in FIG. 54 is used, the CRC is simultaneously applied to the SIG B and a scrambler seed. Thus, CRC calculation with respect to a variable length is required for each frequency band. The VHT-SIG B field uses a low modulations scheme and coding rate (BPSK 1/2), and is available for an iterative coding to frequency and an antenna domain, so it has high reliability. Meanwhile, the service field uses the modulation scheme and coding rate used for transmission of data, as it is, so its reliability is relatively variable and generally has low reliability compared with the VHT-SIG B. In this case, the use of a CRC can detect an error of information included in the VHT-SIG B field and an error of a scrambler seed. Thus, when an error of the scrambler seed is detected, the operation of PHY and MAC layers can be stopped, obtaining an effect of reducing power consumption.

In the data transmission and reception method according to the present invention as described above, when the VHT-SIG B field is transmitted, different interleaving is applied to the frequency domain with respect to mutually different transmission streams, thereby obtaining a maximum diversity gain even in the antenna domain. In this respect, however, in order to obtain similar effects while slightly reducing the complexity, cyclic delay diversity (CDD) technique may be used to transmit the VHT-SIG B field, without applying different interleaving to each transmission stream. In this case, the same data is transmitted by each transmission antenna, and here, a different delay is applied to each antenna.

Figure 55:
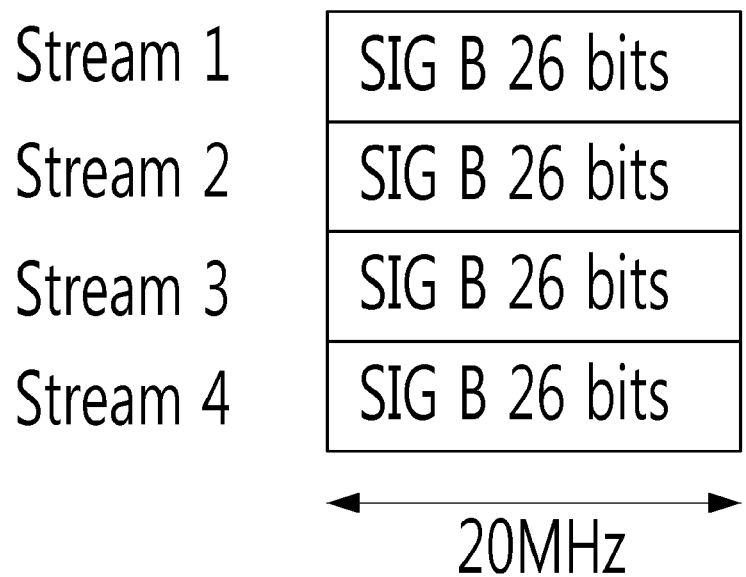
FIG. 55 shows an embodiment of applying the data transmission method according to the present invention to a case in which a station (STA) receives four streams in a 20 MHz frequency band, when cyclic delay diversity (CDD) technique is used and different delay is applied to each antenna.
Figure 56:
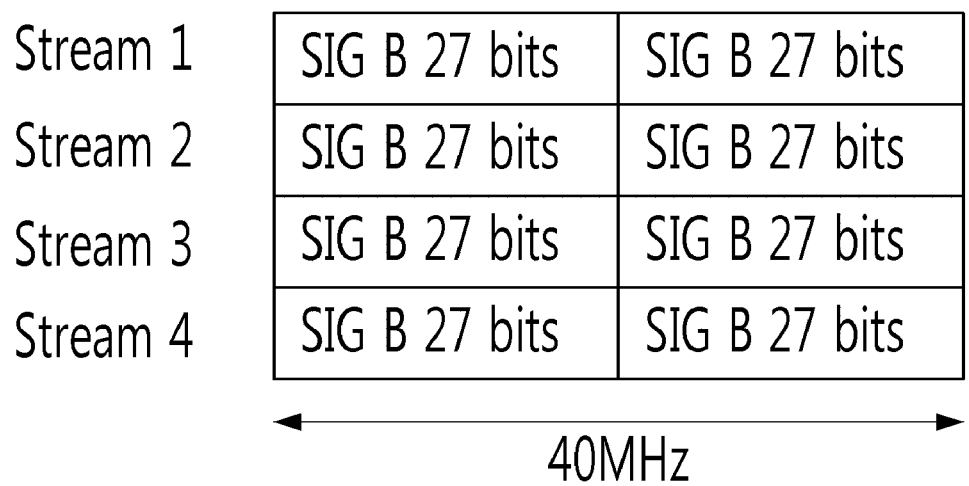
FIG. 56 shows an embodiment of applying the data transmission method according to the present invention to a case in which a station (STA) receives four streams in a 40 MHz frequency band, when a CDD technique is used and different delay is applied to each antenna.

FIG. 55 shows an embodiment of applying the data transmission method according to the present invention to a case in which a station (STA) receives four streams in a 20 MHz frequency band, when cyclic delay diversity (CDD) technique is used and different delay is applied to each antenna. FIG. 56 shows an embodiment of applying the data transmission method according to the present invention to a case in which a station (STA) receives four streams in a 40 MHz frequency band, when a CDD technique is used and different delay is applied to each antenna. FIG. 57 shows an embodiment of applying the data transmission method according to the present invention to a case in which a station (STA) receives four streams in an 80 MHz frequency band, when a CDD technique is used and different delay is applied to each antenna. Different delay is applied to each stream of FIGS. 55, 56, and 57. The present invention can be applicable even when the number of transmitted streams is changed in the embodiments of FIGS. 55, 56, and 57.

Also, spreading matrix to the antenna domain having a size of (number of transmission antennas and number of transmission antennas) may be additionally applicable to the VHT-SIG B transmission scheme of the present invention. When different interleaving is applied to each stream, the spreading matrix when multi-stream is applied can be applicable, and when each stream is transmitted by applying delay thereto, the spreading matrix when a single stream is applied can be applicable.

Figure 58:
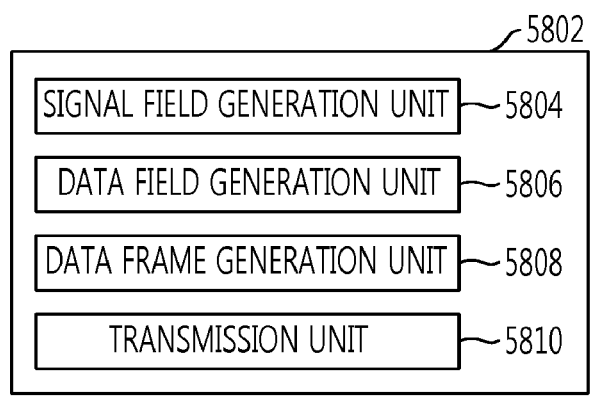
FIG. 58 shows the configuration of a transmission terminal according to an embodiment of the present invention.

FIG. 58 shows the configuration of a transmission terminal according to an embodiment of the present invention.

A transmission terminal 5802 includes a signal field generation unit 5804, a data field generation unit 5806, a data frame generation unit 5808, and a transmission unit 5810. The signal field generation unit 5804 iteratively generates a signal field according to a frequency band applied to transmission of a data frame. The data field generation unit 5806 generates a data field including data to be transmitted to a reception terminal. The data frame generation unit 5808 generates a data frame including the signal field generated by the signal field generation unit 5804 and the data field generated by the data field generation unit 5806. The transmission unit 5810 transmits the data frame generated by the data frame generation unit 5808 to the reception terminal.

Here, the signal field may include a length field indicating the length of a data field, and the length field may have a length which differs according to a frequency band applied to transmission of a data frame. Also, the signal field may include a modulation and coding scheme (MCS) field indicating a modulation method and a coding method of the data field. Also, the signal field may be a dedicated signal field for transferring information regarding each user. The data frame may include a cyclic redundancy check (CRC) field for detecting an error of the signal field.

Figure 59:
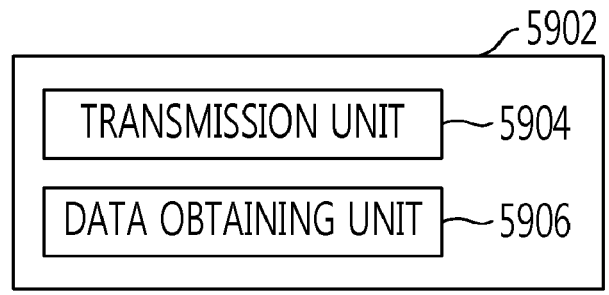
FIG. 59 shows the configuration of a reception terminal according to an embodiment of the present invention.

FIG. 59 shows the configuration of a reception terminal according to an embodiment of the present invention.

A reception terminal 5902 includes a reception unit 5904 and a data obtaining unit 5906. The reception unit 5904 receives a data frame including a signal field and a data field.

Here, the signal field may include a length field indicating the length of a data field, and the length field may have a length which differs according to a frequency band applied to transmission of a data frame. Also, the signal field may include a modulation and coding scheme (MCS) field indicating a modulation method and a coding method of the data field. Also, the signal field may be a dedicated signal field for transferring information regarding each user. The data frame may include a cyclic redundancy check (CRC) field for detecting an error of the signal field.

The data obtaining unit 5906 obtains data included in the data field by using the signal field included in the received data frame. Here, the data obtaining unit 5906 may obtain the data by using the length field, the MCS field, or the like, included in the signal field. Also, the data obtaining unit 5906 may detect an error of the signal field by using the CRC field included in the data frame.

Figure 60:
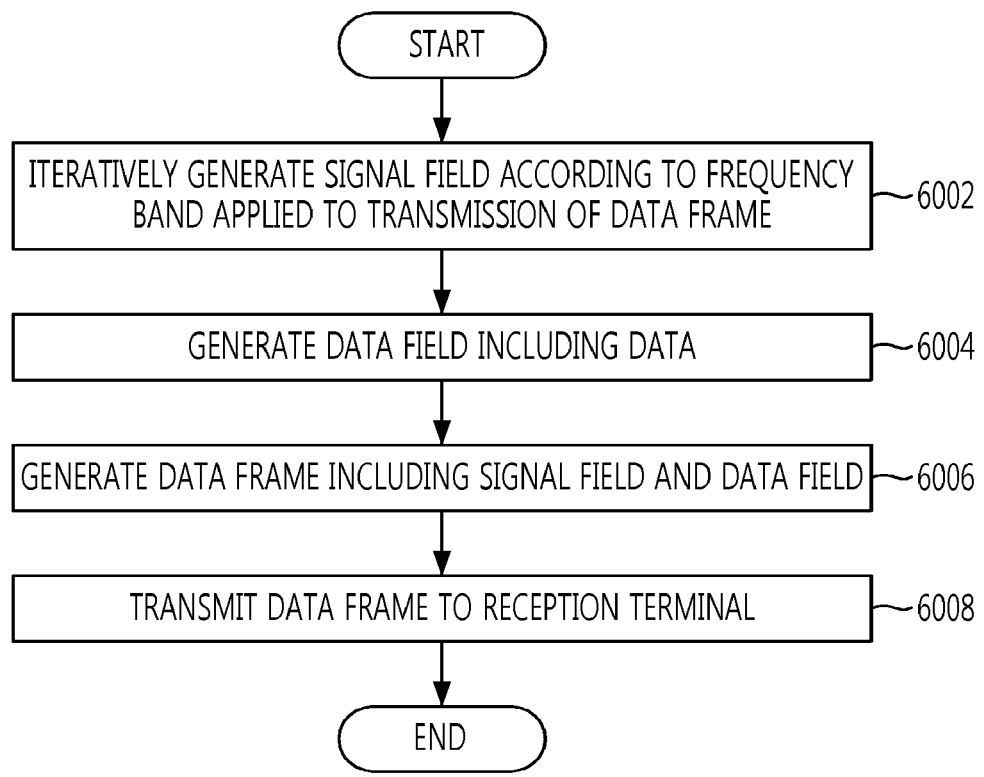
FIG. 60 is a flow chart illustrating an embodiment of a method for transmitting data by a transmission terminal according to an embodiment of the present invention.

FIG. 60 is a flow chart illustrating the process of a method for transmitting data by a transmission terminal according to an embodiment of the present invention.

First, a signal field is iteratively generated according to a frequency band applied to transmission of a data frame (6002). Also, a data field including data to be transmitted to a reception terminal is generated (6004). And then, a data frame including the generated signal field and data field is generated (6006). Thereafter, the generated data frame is transmitted to a reception terminal (6008).

Here, the signal field may include a length field indicating the length of the data field, and the length field may have a length which differs according to a frequency band applied to transmission of the data frame. Also, the signal field may include a modulation and coding scheme (MCS) field indicating a modulation method and a coding method of the data field. Also, the signal field may be a dedicated signal field for transferring information regarding each user. The data frame may include a cyclic redundancy check (CRC) field for detecting an error of the signal field.

Figure 61:
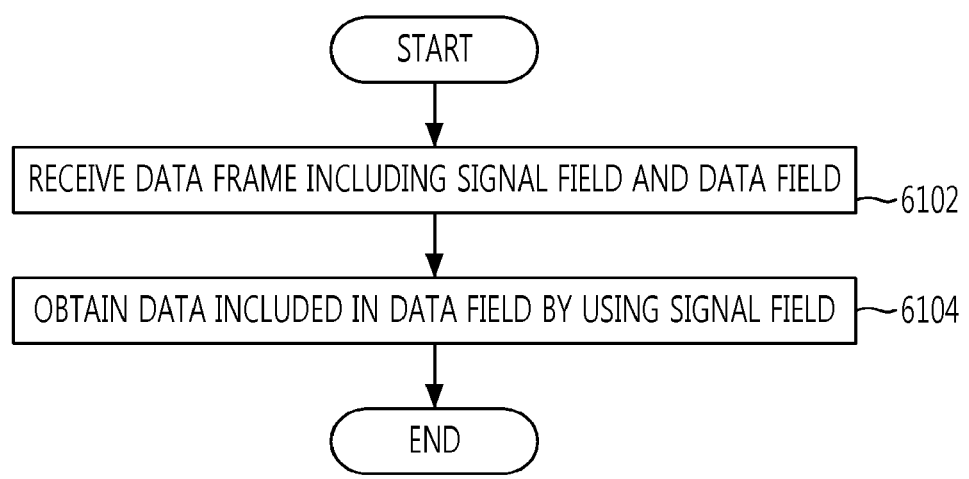
FIG. 61 is a flow chart illustrating an embodiment of a method for receiving data by a reception terminal according to an embodiment of the present invention.

FIG. 61 is a flow chart illustrating the process of a method for receiving data by a reception terminal according to an embodiment of the present invention.

First, a data frame including a signal field and a data field is received (6102). Here, the signal field may include a length field indicating the length of the data field, and the length field may have a length which differs according to a frequency band applied to transmission of the data frame. Also, the signal field may include a modulation and coding scheme (MCS) field indicating a modulation method and a coding method of the data field. Also, the signal field may be a dedicated signal field for transferring information regarding each user. The data frame may include a cyclic redundancy check (CRC) field for detecting an error of the signal field.

And then, data included in the data field is obtained by using the signal field included in the received data frame (6104). In this case, the reception terminal may obtain data by using the length field, the MCS field, or the like, included in the signal field. Also, the reception terminal may detect an error of the signal field by using a CRC field included in the data frame.

According to embodiments of the present invention, when a dedicated signal field is transmitted in the MU-MIMO system, the performance of the signal field is enhanced and a transmission time is reduced by utilizing the user frequency band and the number of streams, whereby a large amount of information can be effectively transmitted by using the signal field.

Although the present invention has been described with reference to exemplary embodiments and the accompanying drawings, it would be appreciated by those skilled in the art that the present invention is not limited thereto but various modifications and alterations might be made without departing from the scope defined in the claims and their equivalents.

The invention claimed is:

1. A wireless communication method, the method comprising:
receiving, by a receiver, a Very High Throughput Signal A (VHT-SIG-A) field on an operating band, the operating band comprising a plurality of 20 MHz bands; and
receiving, by the receiver, a Very High Throughput Signal B (VHT-SIG-B) field on the operating band,
wherein:
the VHT-SIG-A field is transmitted on each of the plurality of 20 MHz bands;
the VHT-SIG-B field comprises a first portion of bits, wherein the first portion of bits is repeated in the VHT-SIG-B field;
the first portion of bits comprises a length indicator; and
a first number of bits representing the length indicator when the operating band is 40 MHz is smaller than a second number of bits representing the length indicator when the operating band is equal to or larger than 80 MHz.

2. The method of claim 1, wherein the VHT-SIG-A field occupies two orthogonal frequency-division multiplexing (OFDM) symbols and the VHT-SIG-B field occupies one OFDM symbol.

3. The method of claim 1, wherein the first portion of bits consists of 27 bits and the first number of bits representing the length indicator is 17, if the bandwidth of the operating band is 40 MHz.

4. The method of claim 1, wherein the first portion of bits consists of 29 bits and the second number of bits representing the length indicator is 19, if the bandwidth of the operating band is larger than 40 MHz.

5. The method of claim 1, further comprising:
receiving a data field, the data field including a cyclic redundancy check (CRC) field used for detecting an error of the VHT-SIG-B field.

6. The method of claim 5, wherein the VHT-SIG-A field, the VHT-SIG-B field and the data field are transmitted as a physical layer convergence procedure (PLCP) protocol data unit (PPDU).

7. The method of claim 1, wherein the VHT-SIG-A field includes first information common to a plurality receivers and the VHT-SIG-B field includes second information specific to the receiver.

8. The method of claim 1, wherein:
the first portion of bits includes an index regarding modulation and coding scheme (MCS), the length indicator and tail bits; and
the index regarding MCS is 4 bits long, the tail bits are 6 bits long, and the length indicator is shorter than 20 bits.

9. The method of claim 1, further comprising obtaining data based on the VHT-SIG-A field and the VHT-SIG-B field.

10. A wireless communication apparatus, comprising:
a processor; and
a memory operably coupled with the processor and storing instructions that, when executed by the processor, cause the wireless communication apparatus to:
receive a Very High Throughput Signal A (VHT-SIG-A) field on an operating band, the operating band comprising a plurality of 20 MHz bands;
receive a Very High Throughput Signal B (VHT-SIG-B) field on the operating band,
wherein:
the VHT-SIG-A field is transmitted on each of the plurality of 20 MHz bands;
the VHT-SIG-B field comprises a first portion of bits, wherein the first portion of bits is repeated in the VHT-SIG-B field;
the first portion of bits comprises a length indicator; and
a first number of bits representing the length indicator when the operating band is 40 MHz is smaller than a second number of bits representing the length indicator when the operating band is equal to or larger than 80 MHz.

11. The apparatus of claim 10, wherein the VHT-SIG-A field occupies two orthogonal frequency-division multiplexing (OFDM) symbols and the VHT-SIG-B field occupies one OFDM symbol.

12. The apparatus of claim 10, wherein the first portion of bits consists of 27 bits and the first number of bits representing the length indicator is 17, if the bandwidth of the operating band is 40 MHz.

13. The apparatus of claim 10, wherein the first portion of bits consists of 29 bits and the second number of bits representing the length indicator is 19, if the bandwidth of the operating band is 40 MHz.

14. The apparatus of claim 10, wherein the VHT-SIG-A field includes first information common to a plurality receivers and the VHT-SIG-B field includes second information specific to the receiver.

15. The apparatus of claim 10, wherein the first portion of bits includes an index regarding modulation and coding scheme (MCS), the length indicator and tail bits, and wherein the index regarding MCS is 4 bits long, the tail bits are 6 bits long, and the length indicator is shorter than 20 bits.

16. The apparatus of claim 10, wherein the at least one processor is further configured to obtain data based on the VHT-SIG-A field and the VHT-SIG-B field.

17. A wireless communication method, the method comprising:
receiving a first control field on a first frequency band, a bandwidth of the first frequency band being a multiple of 20 MHz; and
receiving a second control field on the first frequency band,
wherein:
the second control field comprises a first indicator indicating a length of user data, a reserved bit portion subsequent to the first indicator and a tail bit portion subsequent to the reserved bit portion; and
a first number of bits representing the first indicator when the first frequency band is 40 MHz is smaller than a second number of bits representing the first indicator when the first frequency band is equal to or larger than 80 MHz.

18. The method of claim 17, wherein a number of bits representing the first indicator is increased as the bandwidth of the first frequency band increases.

19. The method of claim 17, wherein a number of bits representing the first indicator is one of 17, 19 and 21 bits, and the tail bit portion consists of 6 bits.

20. The method of claim 19, wherein the first control field is a Very High Throughput Signal A (VHT-SIG-A) field and the second control field is a Very High Throughput Signal B (VHT-SIG-B) field, and wherein the first control field comprises two orthogonal frequency division multiplexing (OFDM) symbols and the second control field comprises one OFDM symbol.

21. The method of claim 17, wherein:
the bandwidth of the first frequency band is 40 MHz, the second control field comprises two identical control sub-fields each comprising in order the first indicator, the reserved bit portion and the tail bit portion; and
the first indicator consists of 19 bits, the reserved bit portion consists of 2 bits, and each of the two control sub-fields consists of 27 bits.

22. The method of claim 17, wherein:
the bandwidth of the first frequency band is 40 MHz, the second control field comprises four identical control sub-fields each comprising in order the first indicator, the reserved bit portion and the tail bit portion; and
the first indicator consists of 21 bits, the reserved bit portion consists of 2 bits, and each of the control sub-fields consists of 29 bits.

23. The method of claim 17, further comprising:
receiving a data field subsequent to the second control field, the data field comprising a cyclic redundancy check (CRC) field used for detecting an error of the second control field.

24. A wireless communication device, comprising:
a processor; and
a memory operably coupled with the processor and storing program instructions that, when executed by the processor, cause the wireless communication device to:
receive a first control field on a first frequency band, a bandwidth of the first frequency band being a multiple of 20 MHz; and
receive a second control field on the first frequency band, wherein:

the second control field comprises a first indicator indicating a length of user data, a reserved bit portion subsequent to the first indicator and a tail bit portion subsequent to the reserved bit portion, and a first number of bits representing the first indicator when the first frequency band is 40 MHz is smaller than a second number of bits representing the first indicator when the first frequency band is equal to or larger than 80 MHz.

25. The device of claim 24, wherein a number of bits representing the first indicator is increased as the bandwidth of the first frequency band increases.

26. The device of claim 24, wherein a number of bits representing the first indicator is one of 17, 19 and 21 bits, and the tail bit portion consists of 6 bits.

27. The device of claim 26, wherein the first control field is a Very High Throughput Signal A (VHT-SIG-A) field and the second control field is a Very High Throughput Signal B (VHT-SIG-B) field, and wherein the first control field comprises two orthogonal frequency division multiplexing (OFDM) symbols and the second control field comprises one OFDM symbol.

28. The device of claim 24, wherein:
the bandwidth of the first frequency band is larger than 40 MHz, the second control field comprises two identical control sub-fields each comprising in order the first indicator, the reserved bit portion and the tail bit portion; and
the first indicator consists of 19 bits, the reserved bit portion consists of 2 bits, and each of the two control sub-fields consists of 27 bits.

29. The device of claim 24, wherein:
the bandwidth of the first frequency band is 40 MHz, the second control field comprises four identical control sub-fields each comprising in order the first indicator, the reserved bit portion and the tail bit portion; and
the first indicator consists of 21 bits, the reserved bit portion consists of 2 bits, and each of the control sub-fields consists of 29 bits.

30. The device of claim 24, wherein the processor, when performing the program instructions, further causes the wireless communication device to:
receive a data field subsequent to the second control field, the data field comprising a cyclic redundancy check (CRC) field used for detecting an error of the second control field.

31. A communication method in a wireless network, the method comprising:
transmitting a first control field over a first frequency band, a bandwidth of the first frequency band being a multiple of 20 MHz; and
transmitting a second control field over the first frequency band,
wherein the second control field comprises a first indicator indicating a length of subsequent user data, a reserved bit portion subsequent to the first indicator and a tail bit portion subsequent to the reserved bit portion, and
wherein a number of bits comprising the first indicator when the first frequency band is 40 MHz is smaller than a number of bits comprising the first indicator when the first frequency band is larger than 40 MHz.

32. The method of claim 31, wherein the number of bits comprising the first indicator is increased as the bandwidth of the first frequency band increases.

33. The method of claim 31, wherein the number of bits comprising the first indicator is one of 17, 19 and 21 bits, and a length of the tail bit portion is 6 bits.

34. The method of claim 33, wherein the first control field is a Very High Throughput Signal A (VHT-SIG-A) field and the second control field is a Very High Throughput Signal B (VHT-SIG-B) field, and wherein the first control field comprises two orthogonal frequency division multiplexing (OFDM) symbols and the second control field comprises one OFDM symbol.

35. The method of claim 31, wherein the bandwidth of the first frequency band is 40 MHz, the second control field comprises two identical control sub-fields each comprising in order the first indicator, the reserved bit portion and the tail bit portion, and
wherein a length of the first indicator is 19 bits, a length of the reserved bit portion is 2 bits, and each of the two control sub-fields is 27 bits long.

36. The method of claim 31, wherein the bandwidth of the first frequency band is larger than 40 MHz, the second control field comprises four identical control sub-fields each comprising in order the first indicator, the reserved bit portion and the tail bit portion, and
wherein a length of the first indicator is 21 bits, a length of the reserved bit portion is 2 bits, and each of the control sub-fields is 29 bits long.

37. The method of claim 31, further comprising:
transmitting a data field subsequent to the second control field, the data field comprising a cyclic redundancy check (CRC) field used for detecting an error of the second control field.

38. A communication device, comprising:
a processor; and
a memory operably coupled with the processor and storing program instructions that, when executed by the processor, cause the communication device to:
transmit a first control field over a first frequency band, a bandwidth of the first frequency band being a multiple of 20 MHz; and
transmit a second control field over the first frequency band,
wherein the second control field comprises a first indicator indicating a length of subsequent user data, a reserved bit portion subsequent to the first indicator and a tail bit portion subsequent to the reserved bit portion, and
wherein a number of bits comprising the first indicator when the first frequency band is 40 MHz is smaller than a number of bits comprising the first indicator when the first frequency band is larger than 40 MHz.

39. The device of claim 38, wherein the number of bits comprising the first indicator is increased as the bandwidth of the first frequency band increases.

40. The device of claim 38, wherein the number of bits comprising the first indicator is one of 17, 19 and 21 bits, and a length of the tail bit portion is 6 bits.

41. The device of claim 40, wherein the first control field is a Very High Throughput Signal A (VHT-SIG-A) field and the second control field is a Very High Throughput Signal B (VHT-SIG-B) field, and wherein the first control field comprises two orthogonal frequency division multiplexing (OFDM) symbols and the second control field comprises one OFDM symbol.

42. The device of claim 38, wherein the bandwidth of the first frequency band is 40 MHz, the second control field comprises two identical control sub-fields each comprising in order the first indicator, the reserved bit portion and the tail bit portion, and wherein a length of the first indicator is 19 bits, a length of the reserved bit portion is 2 bits, and each of the two control sub-fields is 27 bits long.

43. The device of claim 38, wherein the bandwidth of the first frequency band is larger than 40 MHz, the second control field comprises four identical control sub-fields each comprising in order the first indicator, the reserved bit portion and the tail bit portion, and wherein a length of the first indicator is 21 bits, a length of the reserved bit portion is 2 bits, and each of the control sub-fields is 29 bits long.

44. The device of claim 38, wherein the processor, when performing the program instructions, further causes the communication device to:

transmit a data field subsequent to the second control field, the data field comprising a cyclic redundancy check (CRC) field used for detecting an error of the second control field.

* * * * *